(12) United States Patent
Wexler et al.

(10) Patent No.: US 9,489,460 B2
(45) Date of Patent: Nov. 8, 2016

(54) SYSTEM AND METHOD FOR GENERATING EXPERT CURATED RESULTS

(71) Applicants: Michael Wexler, Brookline, MA (US); Allyson Shear, Boston, MA (US)

(72) Inventors: Michael Wexler, Brookline, MA (US); Allyson Shear, Boston, MA (US)

(*) Notice: Subject to any disclaimer, the term of this patent is extended or adjusted under 35 U.S.C. 154(b) by 133 days.

(21) Appl. No.: 14/141,756

(22) Filed: Dec. 27, 2013

(65) Prior Publication Data

US 2015/0006492 A1    Jan. 1, 2015

Related U.S. Application Data

(60) Provisional application No. 61/839,607, filed on Jun. 26, 2013.

(51) Int. Cl.
*G06F 17/30* (2006.01)
(52) U.S. Cl.
CPC .................... *G06F 17/30864* (2013.01)
(58) Field of Classification Search
CPC ............................................. G06F 17/30864
See application file for complete search history.

(56) References Cited

U.S. PATENT DOCUMENTS

2007/0055656 A1* 3/2007 Tunstall-Pedoe . G06F 17/30654
2008/0109491 A1* 5/2008 Gupta .................... G06Q 10/10

* cited by examiner

*Primary Examiner* — William Spieler
(74) *Attorney, Agent, or Firm* — Wolf, Greenfield & Sacks, P.C.

(57) ABSTRACT

Aspects and embodiments are directed to systems and methods for managing validated information. Validated information can leverage previous research on an issue, track social interaction around the issue, and simplify any request from information on the same or related problems. Additionally, validated information can include background information on an issue being addressed (e.g., a tech support question), information on how the issue was resolved, links to source information used to resolve the issue, and can provide information on whether the resolution continues to be effective for other users. According to some embodiments, validated information can be organized into answer objects configured to provide an answer to a technical question. According to one embodiment, this capture of information into a validated knowledge base facilitates subsequent requests and better leverages the best resolutions by tracking, scoring, and elevating search results (including, for example, answer objects) and/or users that are the most effective.

32 Claims, 13 Drawing Sheets

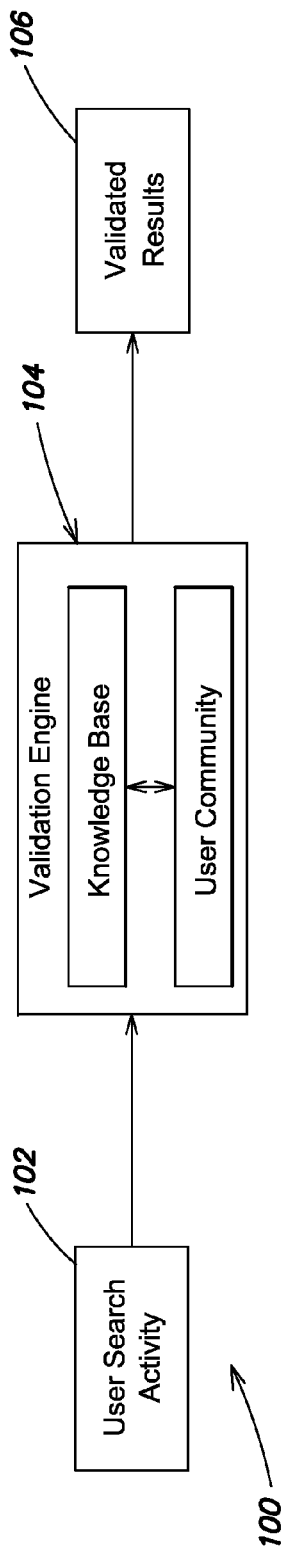

SYSTEM AND METHOD FOR GENERATING EXPERT CURATED RESULTS

RELATED APPLICATIONS

This application is a non-provisional of and claims priority under 35 U.S.C. §119(e) to U.S. Provisional App. No. 61/839,607, entitled "SYSTEM AND METHOD FOR GENERATING EXPERT CURATED RESULTS," filed Jun. 26, 2013, which application is incorporated herein by reference in its entirety.

BACKGROUND

Conventionally, tech support staff and agents primarily use web searches to find solutions to complex technical support questions. While the modern information age provides unprecedented access to tools, advice, and information, conventional systems can fail to integrate resources and provide limited capability to re-use and leverage previous knowledge requests.

SUMMARY

It is realized that such ad-hoc approaches to information gathering and technical support/resolution fail to adequately leverage the results of prior research. Accordingly, some aspects and embodiments are directed to systems and methods for managing validated information. According to one aspect, validated information can leverage previous research on an issue, track social interaction around the issue, and simplify any request from information on the same or related problems. Additionally, validated information can include background information on an issue being addressed (e.g., a tech support question), information on how the issue was resolved, and links to source information used to resolve the issue, among other information. Such validated information can provide information on whether the resolution continues to be effective for other users. According to some embodiments, validated information can be organized into answer objects configured to provide an answer to a technical question. According to one embodiment, this capture of information into a validated knowledge base facilitates subsequent requests and better leverages the best resolutions by tracking, scoring, and elevating search results (including, for example, answer objects) and/or users that are the most effective.

Various embodiments of the systems and methods can be configured to perform one or more functions with regard to validated information. For example, various embodiments may either alone or in combination with other functions, seed search results with automatically validated information, capture validated information from user populations, record user activity to generate validated knowledge bases, integrate validated information with general web-based results, and can, in some examples, further serve as an integration platform between validated information, web-based results, and commercial information systems (e.g., issue tracking systems, customer relationship management ("CRM") software, among other options).

Various embodiments can be used to address conventional problems with searching the web and/or non-validated information to address, for example, tech support issues. In some conventional approaches, once a technical solution is found via web search, the solution, the search, and the source of information are not captured anywhere for re-use by other tech support knowledge workers. Some embodiments of the validated system solve this problem by enabling the tech support knowledge worker to tag and store the best solutions and make those validated solutions available to a global community of users. The tech support worker creates validated information by selecting the information that solved his request and saving that information. The system can capture additional information as part of the creation of the validated information (e.g., search terms, user profile information, source, among other options). The validated information can be further validated by the system. For example, subsequent tech support users will search on the same or similar problem and receive validated information as a search result. Those users can evaluate the answer captured in the validated information. For examples, those users can rating the answer, comment on the answer, use the answer, and through system tracking that answer can be promoted so that answer is prominently displayed to later searchers. Rather than having thousands of help desk staff and tech support call center agents around the world spend wasted time searching the web for the same/similar answers to the exact same tech support questions, the system can enable a community to benefit from the first search, result, and subsequent tracking on the effectiveness of the result through, for example, additional validation.

According to one aspect, a system for managing validated information is provided. The system comprises at least one processor operatively connect to a memory; a search component, executed by the at least one processor, configured to execute searches on a validated information source based on search activity from a user, monitor search activity of the user performed against at least one non-validated information source, integrate validated results returned from the validated information source with results non-validated generated against the at least one non-validated information source, and a display component, executed by the at least one processor, configured to generate a display of the validated and non-validated results shown on a computer system of the user. In one embodiment, the display component is configured to order at least the validated results based on respective validation scores associated with the respective results. In one embodiment, the display component is configured to group the displayed results based on whether the results are from validated or non-validated information sources. In one embodiment, the display component is configured to order at least the validated results within the grouped display based on respective validation scores associated with the respective results. In one embodiment, the system further comprises a generation component, executed by the at least one processor, configured to create validated information. In one embodiment, the generation component is configured to identify related validated information by matching at least one of concept, search terms, or search activity associated with the validated information. In one embodiment, the generation component is configured to capture at least a portion of a non-validated information source responsive to user input, and store the at least a portion of the non-validated information source as an answer object.

In one embodiment, the generation component is configured to merge at least another portion of at least one additional non-validated information source into the answer object. In one embodiment, the system further comprises a promotion component, executed by the at least one processor, configured to assign a validation score to validated information. In one embodiment, the promotion component is configured to determine the validation score based on at least one of a generating user's profile information, an information source for the validated information, or a baseline score. In one embodiment, the promotion component is configured to determine the validation score for an information object responsive to a knowledge domain or knowledge sub-domain. In one embodiment, the promotion component is configured to modify the validation score associated with respective validated information based on subsequent access to the respective validated information. In one embodiment, subsequent access includes at least: returned a result to a search, accessed by a subsequent user, commented on by a subsequent user, rated by a subsequent user, or tagged by a subsequent user.

In one embodiment, the system further comprises a promotion component, executed by the at least one processor, configured to determine a user score for respective users. In one embodiment, the promotion component is configured to identify expert users within a knowledge domain or sub-domain based on the user score. In one embodiment, the promotion component is configured to determine a respective domain based user score for a respective user within a plurality of knowledge domains or sub-domains. In one embodiment, the promotion component is configured to modify the user score based on at least one of user activity or feedback received on user generated content. In one embodiment, the promotion is configured to determine the user score within a knowledge domain or a knowledge sub-domain. In one embodiment, the system further comprises a community component configured to provide access to validated information. In one embodiment, the community component is configured to generate validated information. In one embodiment, the community component is configured to accept questions and track responses from a user community.

According to one aspect, a system for managing validated information is provided. The system comprises at least one processor operatively connect to a memory; a search component, executed by the at least one processor, configured to execute searches on a validated information source based on search activity from a user; execute search activity of the user against at least one non-validated information source; integrate validated results returned from the validated information source with non-validated results generated against the at least one non-validated information source; a display component, executed by the at least one processor, configured to generate a display of the validated and non-validated results shown on a computer system of the user. In one embodiment, the display component is configured to order at least the validated results based on respective validation scores associated with the respective results. In one embodiment, the display component is configured to group the displayed results based on whether the results are from validated or non-validated information sources. In one embodiment, the display component is configured to order at least the validated results within the grouped display based on respective validation scores associated with the respective results. In one embodiment, the system further comprises a generation component, executed by the at least one processor, configured to create validated information. In one embodiment, the generation component is configured to identify related validated information by matching at least one of concept, search terms, or search activity associated with the validated information.

In one embodiment, the generation component is configured to capture at least a portion of a non-validated information source responsive to user input, and store the at least a portion of the non-validated information source as an answer object. In one embodiment, the generation component is configured to merge at least another portion of at least one additional non-validated information source into the answer object.

In one embodiment, the system further comprises a promotion component, executed by the at least one processor, configured to assign a validation score to validated information. In one embodiment, the promotion component is configured to determine the validation score based on at least one of a generating user's profile information, an information source for the validated information, or a baseline score. In one embodiment, the promotion component is configured to determine the validation score for an information object responsive to a knowledge domain or knowledge sub-domain. In one embodiment, the promotion component is configured to modify the validation score associated with respective validated information based on subsequent access to the respective validated information. In one embodiment, subsequent access includes at least: returned a result to a search, accessed by a subsequent user, commented on by a subsequent user, rated by a subsequent user, and tagged by a subsequent user.

In one embodiment, the system further comprises a promotion component, executed by the at least one processor, configured to determine a user score for respective users. In one embodiment, the promotion component is configured to identify expert users within a knowledge domain or sub-domain based on the user score. In one embodiment, the promotion component is configured to determine a respective domain based user score for a respective user within a plurality of knowledge domains or sub-domains. In one embodiment, the promotion component is configured to modify the user score based on at least one of user activity or feedback received on user generated content. In one embodiment, the promotion is configured to determine the user score within a knowledge domain or a knowledge sub-domain. In one embodiment, the system further comprises a community component configured to provide access to validated information. In one embodiment, the community component is configured to generate validated information. In one embodiment, the community component is configured to accept questions and track responses from a user community.

According to one aspect, a computer implemented method for managing validated information is provided. The method comprises executing, by a computer system, searches on a validated information source based on search activity from a user; monitoring, by the computer system, search activity of the user performed against at least one non-validated information source; integrating, by the computer system, validated results returned from the validated information source with non-validated results generated against the at least one non-validated information source; and generating, by the computer system, a display of the validated and non-validated results.

In one embodiment, the method further comprises an act of ordering at least the validated results based on respective validation scores associated with the respective results. In one embodiment, the method further comprises an act of grouping the displayed results based on whether the results are from validated or non-validated information sources. In one embodiment, the act of ordering includes ordering at least the validated results within the grouped display based on respective validation scores associated with the respective results. In one embodiment, the method further comprises an act of generating validated information.

In one embodiment, the method further comprises an act of identifying related validated information by matching at least one of concept, search terms, or search activity associated with the validated information. In one embodiment, the act of generating validated information includes capturing at least a portion of a non-validated information source responsive to user input, and storing the at least a portion of the non-validated information source as an answer object. In one embodiment, storing the at least a portion of the non-validated information source as an answer object includes merging at least another portion of at least one additional non-validated information source into the answer object.

In one embodiment, the method further comprises an act of assigning a validation score to validated information. In one embodiment, the act assigning the validation score includes determining the validation score based on at least one of a generating user's profile information, an information source for the validated information, or a baseline score. In one embodiment, assigning the validation score includes determining the validation score for an information object responsive to a knowledge domain or knowledge sub-domain. In one embodiment, assigning the validation score includes modifying the validation score associated with respective validated information based on subsequent access to the respective validated information. In one embodiment, subsequent access includes at least: returned a result to a search, accessed by a subsequent user, commented on by a subsequent user, rated by a subsequent user, and tagged by a subsequent user. In one embodiment, the method further comprises an act of determining a user score for respective users. In one embodiment, the method further comprises identifying expert users within a knowledge domain or sub-domain based on the user score.

In one embodiment, the method further comprises determining a respective domain based user score for a respective user within a plurality of knowledge domains or sub-domains. In one embodiment, the method further comprises modifying the user score based on at least one of user activity or feedback received on user generated content. In one embodiment, the method further comprises determining the user score within a knowledge domain or a knowledge sub-domain. In one embodiment, the method further comprises an act of hosting a community presence for accessing validated information. In one embodiment, the method further comprises generating validated information within the hosted community presence. In one embodiment, the method further comprises accepting questions and tracking responses from with a user community.

Still other aspects, embodiments and advantages of these exemplary aspects and embodiments, are discussed in detail below. Moreover, it is to be understood that both the foregoing information and the following detailed description are merely illustrative examples of various aspects and embodiments, and are intended to provide an overview or framework for understanding the nature and character of the claimed aspects and embodiments. Any embodiment disclosed herein may be combined with any other embodiment. References to "an embodiment," "an example," "some embodiments," "some examples," "an alternate embodiment," "various embodiments," "one embodiment," "at least one embodiment," "this and other embodiments" or the like are not necessarily mutually exclusive and are intended to indicate that a particular feature, structure, or characteristic described in connection with the embodiment may be included in at least one embodiment. The appearances of such terms herein are not necessarily all referring to the same embodiment.

BRIEF DESCRIPTION OF DRAWINGS

Various aspects of at least one embodiment are discussed below with reference to the accompanying figures, which are not intended to be drawn to scale. The figures are included to provide an illustration and a further understanding of the various aspects and embodiments, and are incorporated in and constitute a part of this specification, but are not intended as a definition of the limits of any particular embodiment. The drawings, together with the remainder of the specification, serve to explain principles and operations of the described and claimed aspects and embodiments. In the figures, each identical or nearly identical component that is illustrated in various figures is represented by a like numeral. For purposes of clarity, not every component may be labeled in every figure. In the figures:

FIG. 1 is a block diagram of an example embodiment of a system for managing a validated knowledge base;

FIG. 2 is a block diagram of an example validation system, according to one embodiment;

DETAILED DESCRIPTION

Figure 3:
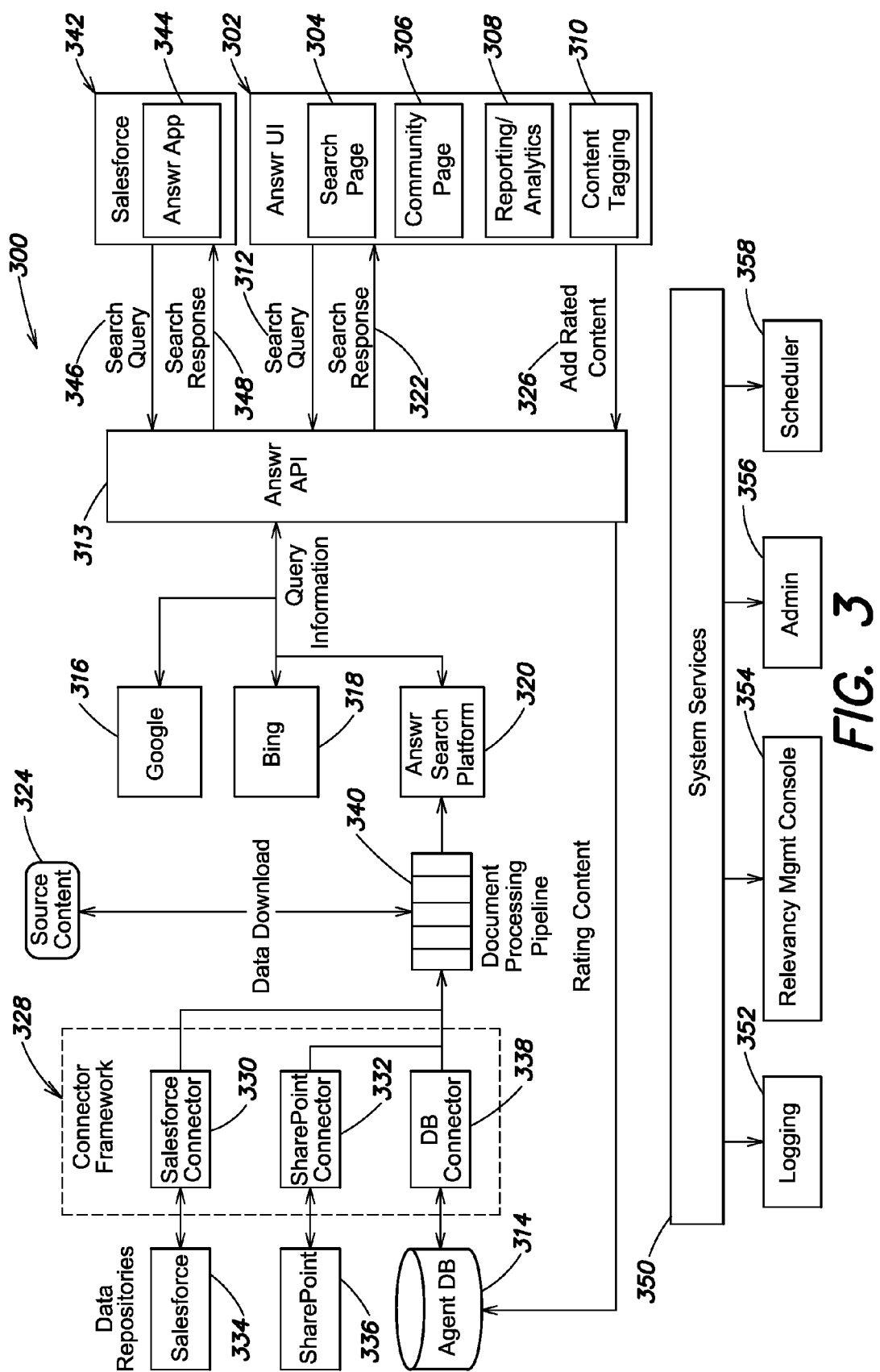
FIG. 3 is a block diagram of an example validation system, according to one embodiment.

Stated broadly, various aspects of the disclosure are directed to systems and methods for managing, generating, and providing validated content. The validated content can be used in a technical support setting, such that, previous work, searches, solutions, and source material is preserved for other technical support workers. In some embodiments, information for answering a technical support question as well as related information is compiled into an answer object for a respective issue. Use and/or access to the validated content (e.g., the answer object) can be monitored to add additional information (e.g., further validation), and/or to score and promote validated content and the users who generated the validated content. According to one embodiment, access to such expertly validated content or the users themselves provides unique opportunities to leverage existing knowledge and preserve its use across user communities.

In an example implementation, when a user searches for an answer, the user can be served results from validated information that has already been expert validated by another tech support knowledge worker. Based on monitoring, knowledge base maintained by the system grows with every user interaction, being continually updated (e.g., on a global basis) as subsequent users access validated information and/or create their own. For example, the knowledge base can be updated as tech support knowledge workers search the web for solutions (e.g., from validated and non-validated sources) to the newest problems. In one example, the system facilitates user identification (e.g., tagging) of the results(s) that provide the answer, the source of information for the answer, and storage of those results and user information that provide a definitive answer. The system may be configured to score and promote potential solutions, promoting the most relevant and/or best answers facilitating quick and efficient problem resolution.

This invention is not limited in its application to the details of construction and the arrangement of components set forth in the following description or illustrated in the drawings. The invention is capable of other embodiments and of being practiced or of being carried out in various ways. Also, the phraseology and terminology used herein is for the purpose of description and should not be regarded as limiting. The use of "including," "comprising," "having," "containing," "involving," and variations thereof herein is meant to encompass the items listed thereafter and equivalents thereof as well as additional items.

Various embodiments, of a validation system include and describe systems, applications, and/or components for providing validated responses to search queries. FIG. 1 shows a block diagram of an example embodiment of a system 100 for managing a validated knowledge base. According to some embodiments, system 100 can manage the validated knowledge base using a validation engine 104. According to one embodiment, user queries 102 (including for example, search terms, query logic, search navigation selection, among other options) can be processed by the system 100 and/or the validation engine 104 to return a set of validated results matching the user query at 106. Components of system 100, including, validation engine 104 can be executed on specially configured computer systems, such as the computer system 1300 or 1302 discussed with reference to FIG. 13.

According to one embodiment, system 100 and/or engine 104 can be configured to provide end-users access to validated search results in the form of answer objects configured to provide an answer or resolution to a technical support problem. The system 100 can be configured to provide validated search results in conjunction with conventional search activity. For example, searching executed in conventional browser applications (e.g., IE, FIREFOX, CHROME, etc.) through available search engines can be augmented with validated search functions that provide or integrate validated results into conventional search results.

In some embodiments, the validated search functions can be provided as a stand-alone application, a browser add-on/plug-in, a browser tool bar, a search site, or other application that delivers validated search results in response to search activity by a user (e.g., search queries, query terms, search navigation, faceted search, etc.).

The system may also include a community presence, where the community can operate to review and validate search result information. In some embodiments, the community generates comments on specific results, comments on source information for results, comments on users, ratings of validated information and/or answer objects, among other options. The commentary submitted can be aggregated by the system along with the results to provide a validated knowledge base. Each comment on a respective information source, user, or answer can be used by the system to improve the validated knowledge base.

For example, community members can provide feedback on search results, which can be used by the system to score and promote validated search results. According to one embodiment, system and or the community can feature user profiles to facilitate collection of comments and scoring of information, among other options. Each user can develop a reputation (for example, based on score) for expertise in one or more areas based on how their answers to specific problems, queries, or questions are scored. Scoring can include criteria for relevance of an answer and effectiveness of an answer among other options. Results can be presented based on information tiers including validated, expert validated, and non-validated. Within information tiers results can be further ordered based on system scoring and/or promotion rules. Ordering on tiers or within tiers can be configured to present validated information having the most relevance and/or best score, increasing the likelihood of obtaining a useful answer to, for example, a technical problem.

Dynamic feedback from the community and/or tracking of actual use of results can be used by the system to modify scores resulting in varying promotion order over time. In some examples, the system 100 is configured to track user search activity and/or use of validated and non-validated search results. The tracking information can be used by the system 100 to modify scoring of information and/or associated users. Additionally, user feedback can be evaluated by the system to increase or decrease scoring.

In some embodiments, user scores can be incorporated into scoring of validated information affecting the ordering of results (e.g., validated and non-validated). In one example, users can explicitly score validated information on a system defined scale (e.g., number of stars, 1-10, etc.). The validation score for the validated information can be determined based on an average of submitted scores. In some examples, user experience/expertise can be weighted into the calculation of total validation score for respective validated information. After scores are generated, the validation score associated with the validated information can be used to order any set of results of validated information. In some embodiments, the scoring of information and the scoring of users can be linked, such that, for example, user's scores increase as the score for the content they generated increases. Additionally, user scores can increase based on activity within the system. For example, creating content and commenting and/or rating existing content can increase a user's score. In some embodiments, user activity can be associated with a knowledge domain or sub-domain. The modification of a user's scores may be limited to the knowledge domain or sub-domain in which they are participating. In other embodiments, user activity can affect the user's score differently within a knowledge domain or sub-domain (e.g., having greater effect on a domain based user score) and for a score associated with the user outside of the knowledge domain or sub-domain.

According to some embodiments, system 100 is configured to integrate into existing information systems to provide validated results and permit creation of validated content. For example, system 100 can be integrated into existing browser applications, search sites, etc. In one embodiment, system 100 can include locally executed functionality that monitors search functions and/or applications executing search functions to provide integrated search functions. The system can also provide search integration into stand-alone applications that maintain and/or host respective knowledge bases.

In some implementations, various application programming interfaces ("API") can be executed to monitor search activity, capture third party information, incorporate third party information sources into validated knowledge bases, and return validated results that integrate any one or more of public sourced validated results, third party sourced validated results, non-validated results (e.g., public and third party). Additionally, the system 100 can include multiple APIs to integrate search operations across multiple third party information systems (e.g., customer service software solutions ("CSS"), customer relationship management systems ("CRM"), issue ticketing systems, collaboration software platforms, and/or search engines (e.g., GOOGLE, BING, etc.)).

According to one aspect, tracking of such information, how it accessed, the use of the information, and/or scoring of the providers (e.g., information source and user supplying the information) provides unique insight into the information's value, respective user's information value, etc. The system 100 can be configured to provide reporting and/or analytics on specific users and how they are ranked in the system. Some embodiments can be configured to identify expertise in various knowledge domains (e.g., with respect to a specific product, a company's product line, category of product, technology area, issue, etc.). In some embodiments, the system can create candidate knowledge domains/sub-domains and analyze user activity within candidate domains to determine if there is any value to the candidate domain. For example, if existing scores for users and/or information do not change based on filtering through the candidate domain, the candidate domain can be determined not to have value. If validated information changes order and/or highest scored users change, the system can determine that the candidate domain/sub-domain has value.

Further activity within the domain/sub-domain can be used to validate the domain/sub-domain. For example, if the highest scored results are returned or used with an improved frequency (e.g., based on usage tacking, user ratings, or user comments) for searches that match the new domain when compared to results that would have been returned in the prior domain/sub-domain organization, the candidate domain/sub-domain can be validated.

Further, analytics tools can be provided to generate trends in the knowledge base of validated and non-validated information. In some examples, the system can be configured to provide time based analysis. Time based analysis can enable, for example, administrative users to takes snap shots of current trends as well as trends at past points of time.

Various implementations of system 100 can be configured to interface with a multitude of information sources including, for example, the Internet, proprietary information systems, CRM systems, CSS systems, among other options. According to one embodiment, system 100 provides access to and augments a validated knowledge base. The validated knowledge base can be segmented into various knowledge domains, where a knowledge domain covers a specific discipline or knowledge area. Various features and embodiments are discussed with respect to a technical support knowledge domain. Various combinations of the features, functions, and operations performed with respect to the technical support knowledge domain are implemented in other knowledge domains according to other embodiments.

According to one embodiment, system 100 can be implemented to provide validated results to users seeking solutions to technical support problems. As discussed, a validation system can provide access to validated search results, where the validated search results have been vetted through, for example, others users seeking to resolve the same or similar problems, user comments received on search results, tracked usage of search results, agreement with a solution, agreement with a user from a user populations, identification of expert technical sources (including for example, validated information sources), etc. Shown in FIG. 2 is an example embodiment of a validation system 200 operating in a technical support domain. System 200 can manage the validated knowledge base on technical support issues using a validation engine 204.

According to one embodiment, user search activity 202 (including for example, search terms, query logic, search navigation selection, among other options) can be processed by the system 200 and/or the validation engine 204 to return a set of validated results 206 matching the user search activity from a knowledge base (e.g. database 207). Components of the system 200, including, validation engine 204 can be executed on specially configured computer systems, such as the computer system 1300 or 1302 discussed with reference to FIG. 13.

According to one embodiment, system 200 and/or engine 204 can include a generation component 208 configured to search for validated results based on user queries, and display validated results (e.g., 206) to the user. Displayed results can also include sets of merged results, displaying validated and non-validated results to the user. In further examples, results without validated matches can also be returned. The system, engine, or generation component can be configured to provide filtered results from non-validated information sources. In some embodiments, the generation component 208 can be configured to provide suggested sites for resolving a user query.

In one example, the system 200 or generation component 208 can be configured to analyze a user query to determine a context, and responsive to the context determination, deliver recommended sites to query. Further, the system 200 can execute the user's query (including, for example, similar query terms) on the recommended sites to deliver non-validated but improved results for the user query. In one embodiment, the system accessed seed sites, either known to the system to be good sources of information in a matching information domain, or sources of information that have been validated by user commentary or ratings.

According to some embodiments, sources of information can be validated based on various sub-domains (e.g., MAC sub-domain, LINUX sub-domain, WINDOWS sub-domain, networking sub-domain, IPHONE sub-domain, ANDRIOD sub-domain, smart phone sub-domain, or any other sub-domain determined based on subject or related information grouping). In further examples, validated sources and validated information can be grouped in domains, and sub-domains. In some embodiments, domain validated information sources can be recommended to users, for example, when no validated results match a user query. Additionally, if a set of results is too few in number or determined not to match well with the user query, validated information sources can be provided by the system 200.

According to one embodiment, the generation component 208 can be configured to support users' search activity in a knowledge base (e.g., database 207) as well as other sources, and display validated data (e.g., 206) that has been commented on and/or tagged by other users. Various embodiments of the generation component can include one or more the example features and any combination of the example features described in greater detail below.

According to one aspect, search, display and commenting functions can be executed by a generation component (e.g., 208). The generation component 208 can be configured to provide search interfaces to search and display validated (i.e. curated results). The generation component 208 can also be configured to capture search activity, for example, search activity performed on browser applications and/or third party search tools. The generation component 208 can be configured to execute the captured search activity on validated knowledge bases to return corresponding validated search results. In one example, the validated results can be integrated into any search results provided by the browser and/or third party search tool. In another example, the generation component 208 can be configured to execute user interface functions that switch between validated result sets and non-validated results.

According to one embodiment, the system and/or generation component 208 is configured to distinguish non-validated results (e.g., web browser results) versus validated results is user interface displays. In one example, the generation component 208 can include at least a browser plug-in or a browser bar. In further examples, generation component 208 can include a mobile application executing on a smart phone. The mobile application can be configured to display when validated results are available and if nothing (no validated results available) for a query entered.

In further embodiments, the generation component 208 can be configured to automatically recognize search activity (e.g., search query terms, faceted search, navigation search, etc.) and generate recommended queries (e.g., similar queries, expanded search terms, domain specific taxonomy terms, etc.). In one example, based on a user entered query, the system and/or generation component 208 generates "like" queries and/or similar validated result sets that may match what the user is looking for.

According to another embodiment, the generation component 208 not only monitors search activity but search results as well. The generation component 208 can be configured to automatically store information on non-validated search results. For example, the system stores information on URLs that have been viewed by other users. The results are identified by the system as possible answers to the query that was previously executed, but have not been validated through comments or tagging.

According to one aspect, system 200, engine 204, and/or generation component 208 are configured to accept user comment on search results to validate the results or to provide opinion on previous comments. In one embodiment, the generation component 208 permits users to identify and tag a search result (e.g., a URL) as relevant to a search query. For example, once a result has been confirmed as a valid answer to a search based upon user commentary, the system stores that results and commentary from the user as validated information. In further embodiments, the generation component 208 provides user facing functionality to "clip" key information from an information source (e.g., a URL page (or save the whole page)) and add relevant annotations/tips/warnings to create validated information (e.g., a tagged URL page or a page having clipped information and/or comments) saved in the system knowledge base (e.g., database 206). The generation component can be configured to accept user commentary in multiple formations including, for example: voice capture, screen share, video capture, typed notes into a validated or "curated" page.

The system can display tagged pages with all relevant data (e.g., clipped data, comments, etc.). In some examples, the system also stores information on the user who created the validated information, tracks the number of times the result is opened by users, and can link similar pages in the knowledge base. Additionally, source material (e.g., URLs, publications, etc.) can be referenced in the validated information to allow users to easily retrieve an originating URL as desired. As discussed, the search activity used to get to the validated information can be stored by the system. In addition, the system can maintain identifying information on users executing those searches. In one example, as validated information is updated through user comments, new notes, addition of source material (e.g., clipped information), the users who previously executed searches matching the validated information, provided comments, or accessed the validated information can receive automatic notifications regarding the update. Additionally as new validated information is identified that better resolves a query, provides an improved solution to a problem, etc., the system can be configured to deliver automatic notifications to users.

In one embodiment, the system 200 and/or generation component 208 can be configured to score validated information, and the user scoring to order search results. For example, the generation component 208 can be configured to boost or lower position in query results displays. The generation component can execute a set of flexible rating criteria/rules to establish scores for each result (including validated results and non-validated results). In one embodiment, the scoring rules modify a score for respective results based on a user or users associated with a result. In another embodiment, a skill level associated with a creating user is used by the generation component to modify the score for the created information. Other embodiments include rules that when executed modify scores based on any one or more of: associated users, user skill, usage statistics, domain/industry segment, timeliness (e.g., date, time opened, etc.), among other options.

According to one implementation, the generation component can provide a knowledge base management facility configured to fine tune scoring of information, results, etc. The management facility can be used to update scoring rules applied, add scoring rules, delete scoring rules, among other options. In further examples, scoring rules can also raise or lower scores based on a user type. For example, technical support users operating in a technical support domain will have a greater impact on scoring than non-expert users, generic users, or users from other knowledge domains.

In some embodiments, result displays use validation scores to order the displayed results. In one example, the scores associated with displayed information (e.g., URLs) provide for relevancy ranking for the associated query. As respective results are accessed and commented on by users, a respective score increases causing the respective results to be promoted in any future result display.

According to another embodiment, the generation component 208 can also be configured to generate validated information having multiple sources (e.g., web-pages, publications, etc.). The generation component 208 can be configured to created validated information as a container with links and/or clipped content from a plurality of information sources. For example, where multiple references or information sources are required to solve a particular problem a user can clip information from any number of sources, and/or provide links to any number of information sources. In one embodiment, the validated information can be displayed in conjunction with any linked sources referenced in the validated information. Such displays can facilitate problem resolution, enabling users to choose to access source material directly or review the validated information.

In other embodiment, the generation component 208 can also be configured to modify displayed information based on whether the information is validated, non-validated, and seeded information. In one embodiment, the system can generate seeded information to improve result sets. Seeded information includes information that has not been validated by a user, but rather tagged or commented by automated system processing. Discussed in greater detail below, system 200 and/or engine 204 can include a administration component 216 configured to automatically notate information with seed comments and/or provide seeded information content generated from search keywords, similar keywords, concepts, etc. In some embodiments, the generation component 208 can prompt users to confirm that seeded comments and/or seeded content is relevant or appropriate transforming the seeded content into validated content.

The system, engine, and/or generation component 208 can be implemented in a variety of user environments. For example, operating environment can be based on a web-browser application and the system operations and functions can be executed through browser plug-in or tool bar. Other examples include stand-alone applications that execute on a user's computer system or communicate with other portions of a validation system (e.g., 200). In some embodiments, the system and/or generation component 208 integrates with third party information systems (e.g., CSS systems, CRM systems, collaboration systems, etc.). The search and commenting functions can also be extended to information stored on the third party systems. The information stored on the third party systems can likewise be scores and results ordered based on the system scoring.

As search results are generated, third party data sources in the results can be associated with information on search activity associated with a result, the user(s) performing the searching, whether the content provides the solution to the search/technical problem, usage information for the respective result, user comments, user access, etc. In various embodiments, the system and/or generation component 208 is configured to provide visual indications for distinguishing information sourced from public data and information sources from third party information systems. In some examples, the generation component 208 is configured to maintain information reflecting a specific third party information system from which information was sourced. The generation component 208 can be configured to limit access to data from third party sources to authorized users.

User feedback (e.g., comments, tags, notes, suggestions, etc.) can be managed by a promotion component. According to one embodiment, system 200 and/or engine 204 can include promotion component 210 configured to manage scoring, ranking, and ordering of search results. The promotion component 210 can operate on information collected at the creation of validated information (e.g., creating user, skill, domain, search terms, identified as the solution, etc.), and can further monitor and adjust scorings associated with that validated information as additional users access and comment on that information. In some embodiments, additional feedback on validated information can be sourced through user communities (e.g., via a community component 218—discussed in greater detail below).

According to one embodiment, the promotion component is configured to analyze user comments for agreement or disagreement with validated information (e.g., a tagged article) and respective content as it relates to an associated query. As discussed, validated information can be stored in the system 200. In one example, the validated information is a data unit stored as faceted data. Each facet related to the data unit and provides descriptive information detailing content, associated, relevance, etc. In one example, one or more queries associated with the validated information can be stored as facets of information. User comments can likewise be stored as information facets. Additional facets can include information on creation time, related queries, related information, accessing users, information source, agreement or disagreement by users, information domain, information sub-domain, user skill level, user expertise ratings, among other options. According to one embodiment, the promotion component 210 accesses available facets of information for validated information to determined a score. In one example, the determined score impacts how the validated information is displayed to users.

The promotion component 210 can be configured to re-calculate or modify scores responsive to new comments (e.g., agree, disagree) resulting in the promotion or demotion of the validated information within respective results.

According to another embodiment, the promotion component 210 can be configured to maintain ratings on users as well as ratings on information. According to one embodiment, the promotion component is configured to increase or decrease an expertise score associated with a user within a knowledge domain and/or sub-domain responsive to a number of validated information objects the user has commented or tagged, a number of validated information objects the user has created, agreement/disagreement from other users, use of validated information objects created by the user, etc. Expertise scores can be specific to a specific knowledge domain or a knowledge sub-domain (e.g. APPLE, SONY, DELL, IBM, MICROSOFT, MAC, WINDOWS, CISCO, networking etc.). In some embodiments, the promotion component 210 can be configured to assign skill level and/or skill scores to users. In one example, skill level and/or score is based on user profile information (e.g., current job, job history, publications (including, for example, blogs, posts, etc), and the promotion component 210 calculates a skill level based on the user profile information. In one example, the web crawling executed by the system (e.g., generation component 208) can also be used to populate user profile information with published articles, posts, etc.

The promotion component 210 can weight input from different users differently, according a stronger weight to input from a domain expert over a user without expertise (for example, as determined by respective skill level and/or expertise score). In addition to updating scoring for information in the knowledge base, the promotion component 210 can be configured to update user's expertise scores and/or skill level based on respective comments, creation and responses to respective validated information, and various interactions with the community of users. In further embodiments, the promotion component 210 can be configured to add skills to a user profile, as their comments and/or generation of validate information demonstrates knowledge or expertise in a particular area. The promotion component 210 can also receive aggregate statistics on a user's promotion rates, activity, etc. and modify expertise scores and/or skill levels accordingly. In one embodiment, the system 200 can include an analytics component 212 configured to generate statistics on information promotion rates, trends in queries and associated problems, trends in validated answers, comments etc. (discussed in greater detail below). For example, the promotion component 210 can access statistics generated by the analytic component 212 to modify expertise scores, skill level, etc.

According to another aspect, the promotion component 210 can be configured to incorporate user ratings and information ratings into leaderboards displayed by the system. Leaderboards can be segmented according to knowledge domains (e.g., tech support), sub-domains (e.g., MAC, WINDOWS, ANDROID, IPHONE, etc.) and show top user contributors, most prolific commenters/taggers, top viewed answer (e.g., validated information result), top community participants, top community collaborator, hottest new topic, and most popular content for a day, week, month, among other options.

According to one embodiment, the system 200 is configured to accept user selections within leaderboards, enabling filtering and monitoring of specific users (e.g., technical support agents), tracking of what information those users are commenting on (e.g., tagging), identify and view similarly commented validated information and/or searches. In some embodiments, the promotion component 210 is configured to modify validation scores for validated information responsive to users tailored search preferences. For example, users can tailor their search preferences based on user they follow on the leaderboards. Users can specify on the system that search results generated in response to their queries should emphasize any validated results associated with followed leaders.

According to some embodiments, the system can include information communities. The system can include, for example, a community component 218 configured to manage the information communities. In some examples, the community component is configured to capture information from the user communities and issues are discussed, commented on, and/or resolved through user interaction. In some embodiments, users can collaborate within the communities to generate answers to questions. The generated answers and exchanges (e.g., comments, agreement, disagreement, etc.) can be incorporated in the knowledge base as validated information. In one example, the generated answers become searchable on the system as validated information. The answers can be commented on, promoted, etc., just as any other information in the knowledge base.

In the technical support space, for example, once validated information has been generated that resolves a particular issue, that validated information can be referenced as a potential answer to that particular issue. Promotion scoring (e.g., by promotion component 210) of the potential answer and/or users associated with it results in the system displaying the highest scored answers to technical problems, improving efficiency, response time, and consistency in resolution. Additionally, if better answers are developed, for example, in the collaboration space of the community, promotion scoring elevates the new answers.

In some examples, the community component 218 provides access to different areas of the community, and can include a separate collaboration space. The collaboration space provides an area for users (e.g., technical agents) in a community to discuss and ask questions around current technical issues, topics of interests, and seek out guidance from experts who are skilled in distinct technical arenas. The community component 218 can organize areas within the community and/or collaboration space into technical areas, broad concepts, and/or issue specific domains.

In one embodiment, the collaboration space is configured to provide an online forum for the agents to ask questions and discuss issues in a traditional format as well as providing for real-time interaction (e.g., instant message, chat, video chat, voice calls, and collaboration services). As discussed, any activity from the community and/or collaboration space can be added to the system knowledge base. For example, once technical issues and questions are discussed and commented on by other agents, the potential answer can be automatically captured in as searchable content (e.g., validated information).

According to one embodiment, the community component 218 is configured to manage an information exchange portion of the community. The information exchange provides an open marketplace for businesses and user (e.g., agents) who use the system to contract for expert content development and/or expertise. In one example, the exchange can be accessed as a separate part of the community space hosted by the system (e.g., 200). In other examples, the exchange can be integrated into the user communities. For example, users associated with a company can access the system to request action by the user community and/or specific users. The community component 218 is configured to provide for request submission (e.g., wireless network card does not function on newest version of 64 bit Windows 8). The community component 218 permits requests to be directed generally or targeted to specific users or user (e.g., from the leaderboards). Request may specify a reward for finding a solution, and may also provide contact information. The community component 218 can be configured to manage communication between responding users and the requestor to defined compensation terms. In another example, a company may see that a certain agent is a leader for information on their products. The company can reach out to contract directly for help in creating content for their website by accessing the information exchange.

According to another aspect, to fully leverage the information knowledge base of the system (e.g., 200) and the user communities, the system 200 and/or engine 204 can include an analytic component 212 configured to generate statistics on the information in the knowledge base and/or user communities. According to one embodiment, the analytic component 212 is configured to allow administrators to review global information on what is going on across all users (e.g., agents) in the knowledge base (e.g., database 207). The analytic component 212 is configured to provide information based on knowledge domain and/or sub-domain, allowing administrators to review information specific to industries, concepts, products, manufacturers, hot topics, prolific users, etc.

In some embodiments, administrative users can be associated on the system with specific agents. For example, agent users can be grouped based on company affiliation (e.g., Microsoft, Salesforce, ZenDesk, Apple, etc.). Administrative users can manage their agents on the system (e.g., adding and removing agents). In some examples, the administrative users can manage user profile information on their assigned users. In some implementations, the administrative users can be responsible for providing skill information, job experience, etc., within their agent profiles. In one embodiment, the analytic component 212 is configured to allow administrative users to view information on how their specific agents use and stand in the system (e.g., authored validated information, commented on information, accessed information, etc.). Further, the analytic component can be configured to provide comparisons between their agents and the global community, compare individual users, among other options.

In some implementations, the analytic component 212 can be configured to restrict access to analytic information to administrative users. In other implementations, the analytic component can provide global statistics to any users. In some examples, information can be designated public and private based on source, and access managed accordingly. According to one embodiment, the analytic component 212 is configured to allow administrative users to view data in the knowledge base at a global level. The analytic component can identify and highlight what trends are developing as the system executes searched and incorporated comments (e.g., tags) into validated information. In the technical support domain, the analytic component is configured to generate formation for displays of trends in support topics, top searches, key problems reported globally across all agents and industries, usage trends, device trends, trends on specific products, specific manufacturers, etc.

The analytic component can be configured to track content that is demoted, by how many agents, and/or which agents. Additionally, the analytic component can be configured to analyze information to determine the popularity of content, usage patterns of the content, "goodness" of the knowledge base data (e.g., track effectiveness of a solution in validated data), within knowledge segments the analytic component can also track how often an user/agent goes out to the information community (including, for example, the information exchange) for more help to resolve a problem.

The analytic component 212 can include a learning module configured to monitor and study usage trends in how agents search and use content in the knowledge base. In some embodiments, the data on usage and search is integrated into rating of information and users to improve scoring and promotion of results. The learning module can also be configured to identify trends in searching (e.g., what terms lead to the best results, most effective results, quickest answer, etc.). The learning module can be configured to apply the search trend information to automatically suggest query alternatives, similar search terms, alternative results—e.g., based on suggested queries etc. The learning module can be configured to respond to developing trends in searching to serve up more accurate results for agents, and dynamically improve suggests search terms, queries, and/or results. In some embodiments, the learning module can perform analysis with knowledge domains/sub-domains and identified trends accordingly.

According to another aspect, the system 200 and/or engine 204 can include an administration ("admin") component 216 configured to manage user registration. Stated broadly, according to some embodiments, the admin component 216 can be configured to address system/application security and the management of a user's profile and their preferences on how they prefer to use the system and all of its features. In one embodiment, the admin component 216 is configured to register users, manage user types and permissions (e.g., general user, technical agent, administrative user, etc.), manage user profiles, company affiliation, define preferences, manage display settings (including, for example, look and feel of the system displays, information community, etc.), among other options.

The admin component 216 is configured to define a unique profile for respective users associated with a username and password. The user profile identifies a respective user (e.g., technical agent) as they comment and/or tag information and search the knowledge based or other sources of information. According to one embodiment, the admin component 216 allows users to set information about themselves that will be displayed as part of the system community: username, avatars, industry, company, area of expertise/key skills, etc. In one example, the users set preferences for searching (e.g., the admin component 216 can accept designation of preferred sources of information, preferred authors, affiliated company, date, etc. to promote specific results returned from searching), browser bar preferences (e.g., display position preferences—top, bottom, side), display preferences, foldering preferences, and if they want to be available for real-time collaboration in the community.

According to some embodiments, the system and/or admin component 216 is configured to allow users to capture credibility ratings developed from other sites and information systems (e.g., stackoverflow provides for user submission of questions and answers, votes received on answers score user responses.) to pre-set scores associated with any one or more of expertise, skill, and credibility level. As the users validate information through the system, the users scores are dynamically adjusted. For example, as user generated answers are promoted, the scorings for that user are also recalibrate upward (or downward if appropriate).

According to another embodiment, the admin component 216 is configured to allow administrative control of user profile information and/or settings. In one example, a user with administrative privileges can modify settings for: company affiliation (in one example, company affiliation allows for segmentation for reporting and analytics purposes); associated users (manage which agents are affiliated to which companies through an admin user interface); view only access (in one example, this setting allows for certain users to be set as read only participants within the system and will eliminate (or limit) ability of a user to validate content (e.g., comment, agree, disagree, etc); access permission (includes controls to completely remove or bar users from the system); skill based access (in one example, the admin component provides controls to limit how a user participates in validating or accessing data—setting minimum skill requirements to comment/agree/disagree); curate and wait (in one example, the admin component provides controls to set criteria for evaluating user content for "expert" qualification which may include minimum criteria—e.g., if user validated information meets the minimum criteria (e.g., rating score, number of agrees, usage minimum, etc.) the information is displayed in an "expert" validated or curated section of the system); validation level criteria (e.g., set criteria for evaluating information according to level: expert level, validated, seeded (system generated content); and co-curation (e.g., sets profile information to enable the system to notify a co-curator, or require approval from the co-curator prior to introduction of user content to the system knowledge based—this allows expert agents to work with less skilled agents to teach them how to properly validate/curate content and write meaningful queries). According to some embodiments, the admin component 216 is configured to provide access to any one or more of the preceding settings to customize user interaction with the system.

In one embodiment, the admin component 216 enables user to include foldering options in their user profile. The foldering functionality allows users to define personal folders into which validated information can be saved for quick access. In some embodiments, the system can provide a favorites folder automatically to preserve a user's most accessed validated information and/or a most recently accessed validated information object. The underlying validated information object can be used to store information on how many times it has been save in a personal folder, or current saves in a personal folder. The usage information can be rendered in leaderboards, for example, to suggest the "best" or "hot" validated information object based on what other users are selecting. In other examples, the analytic component 212 can generate statistics on folders (how many times, current number of folders in which object saved, etc.) and that information can be rendered on the leaderboards.

According to another aspect, the administration component 216 can also be configured to manage operation of the system and default settings, whether the system is implemented as an application, browser bar, stand alone application, distributed application, etc. The admin component 216 is configured to register super users who are the administrators of the system and/or executing application (as opposed to, for example, administrative users who mange company affiliated users). In one embodiment, the super users can configure the system to automatically seed validated content. In one example, the system monitors users searching and if the users do not comment, tag, or endorse the results of their searching, the system is configured to automatically provide comments on the results returned to the users and/or the results the system infers the user accessed to resolve their issue. For example, the admin component 216 can include a seeding module configured to identify content used by users to resolve issues. The seeding component can identify the last accessed information source by a user—and validate that information as a "seeded validation." In another example, in response to user search, the seeding module can label each of the accessed results as a potential solution, elevating that content above non-validated but insuring that subsequent users recognize that any commentary is automated.

Management of the system can also include utilities for controlling relevancy rating management. The rating management functions enable definition of how scores are calculated. For example, the rating management functions can define/change a number of points awarded per comment submitted on information, per new content/solutions created by the user, agreement comments from other users, disagreement comments from other users, etc. In one embodiment, the admin component 216 is configured to modify scoring rules for information and users. In one example, the promotion component can assign points based on number of tags, relevance of the tags, and/or other statistics—those points are then fed into the determination of information and/or user scores.

Some additional management functions can be implemented by the admin component include archival utilities for archiving of unusable/unused content (e.g., seeded and validated information) and may also include functions for removal of inappropriate content from the knowledge base.

In some embodiments, the admin component 216 can include a smart populate module configured to deliver augmented content responsive to user searches. In one example, the smart populate module is configured to dynamically crawl additional information source. For example, the system analyzes user queries as they are being executed to extract key words and perform dynamic searching based on those key words, similar keywords, and/or related queries. The dynamic searching can be executed on "expert" domain sites (e.g., information sources scored by the system as expert), domain validated information sources, and other relevant sources from knowledge based to find source content in cases where no validated information matches a search. In another example, the smart populate module can crawl information sources, including the Internet, based on seed lists of known expert sites (including, for example, validated information sources stored on the system) to make augmented suggestions when displaying non-validated (uncurated) search results to the end user.

According to another embodiment, the system 200 can build and maintain administration libraries that can be accessed by the system and/or various components of the system to execute respective functions. According to one embodiment, administration libraries can be specific to knowledge domains, sub-domains, information topic, etc. The system can maintain and update these domain specific libraries. In one example, the libraries are built with a feature set to support technical support space. The system is configured to modify and/or update the administration libraries according to user feedback/comments received and analyzed on the system. In some examples, manual reporting and review can also be incorporated in updating of administration libraries and, in other examples, through machine learning algorithms. The libraries form one part of the suite of functions configured to analyze information and content to generate augmented information to return to users. In one example, the promotion component 210 can access available administration libraries to augment search capabilities, skill identification and promotion management, and information scoring algorithms.

In some embodiments, the administration libraries include at least an ontology and synonym library. The ontology library stores and provides shared vocabularies, domain synonyms, and unique search terms, for example, in a technical support space. Each user query and the results generated can be analyzed by the system (e.g., based on how well the search terms target the best scored answer for a question) to update library information on search terms and synonyms. Further embodiments, can also include at least a classification/keyword management library. The classification/keyword management library is configured to drive faceted and guided search on the system. Each information object (e.g., validated information) stored on the system can be a data object having a multitude of data facets (attributes describing the data object). The facets for the data object can be un-structured or structured (limiting data objects to system defined facets). In some embodiments, the facets and hence structure for data objects can evolve as users interact with system and comment on data.

In another implementation, the classification/keyword management library is also configured to support auto-completion to aid users (e.g., agents) in creating better queries during search activity. In the technical support space, the classification/keyword management library develops a unique taxonomy dynamically updated with a real-time feedback loop (e.g., from user comments and interaction), constantly updating the categories/facets to assign to data objects and key words to associate with searches based on manual and automated processes.

In other embodiments, the administration libraries include at least an expert domain/site mapping library. The expert domain/site mapping library stores seeded sites and URLs, which have been identified as good sources of information. In one example, the system can validate sources of information (e.g., site, web present, web domain, etc.) and those validated sources can be preferred over general search results. The validated/seeded information sources can be accessed by other system components, for example, to help guide directed and dynamic crawls executed by the system (e.g., a smart populate module). The validated sites can be associated specific domains on which they have been validated (e.g., mobile, MAC, etc.). The system can access validated sources to augment content delivery, for example, as seeded content displayed in the seeded section of a user interface. The seeded data can be presented when there are no or little validated data available on the system for that query.

According to other embodiments, system 200 can also include an integration component 214. The integration component 214 can include a variety of APIs configured to integrate system functionality with existing information systems. In one embodiment, the integration component 214 enables partners to move data in out of the ANSWR system into their own infrastructure, for example, to minimize, transitions between validated result displays and internal search results of the partner system. Integration between existing information systems and validation system can also reduce dual reporting, and data requests through multiple data warehouses, in order to analyzing information.

In some examples, the integration component provides pre-defined integration executables and APIs designed for specific CRM systems used widely in the support space (e.g., Salesforce, Remedy, Microsoft Dynamics, among other options). In other examples, the integration component provides executables and APIs for CSS systems and other information systems.

The integration with the validation system enables customers to leverage data from their own applications (e.g., CRM system) and apply that data and any analysis as part of the search augmentation (e.g., suggested key words) used in searching the validation system knowledge base. In some embodiments, data in the partner systems can be captures and directly correlated to information in the knowledge based. In one example, the integration component is configured to capture product information from a CRM system's data on consumer interaction. The product information can then be used as search executed on the knowledge based to return validated information matching the product information. The integration component 214 can include APIs and/or executables for known support systems as well (e.g., Sharepoint).

According to one embodiment, the integration component can be configured to provide standardize reporting and analytics across partner system and easily plug into a customer's existing internal data warehouse and reporting infrastructure. For example, the integration component is configured with standard APIs which allow customers who are interested in accessing tagged content (but not commenting on or curating data themselves) to easily access and bring validated content into their own knowledge infrastructures. Various embodiments of system 200 can execute any of the functionality described more generally and need not include the components described to execute the associated functionality.

Shown in FIG. 3 is a block diagram of an example architecture of an embodiment of a validation system (e.g., system 100 and 200). System 300 illustrates various technological components that can execute any of the functionality discussed, for example, with respect to system 100 and 200. Users are able to interact with system 300 (the "ANSWR" system) through the system's user interface ("UI") 302. The UI can be configured to present a variety of displays for accessing content on the system. In one example, the UI 302 can present any one or more of pages for searching at 304 (e.g., input queries, search terms, performing search navigation, etc.), pages for accessing the system community (e.g., at 306), pages for viewing data reporting/analytics (e.g., at 308), pages for tagging search results (e.g., at 310), for example, to create validated content. The user can input search queries 312 which can be received by the ANSWR API 313. The APIs can be configured to execute the search query as a "federated" search (e.g., combining multiple search sources). The federated search can be executed against multiple information sources, in one example, based on how the user accessed the system.

For example, if the user accesses the system through a conventional browser, the search will proceed in the browser and through whatever search site the user accessed. The browser may include an ANSWR toolbar configured to capture the search and execute the search against the ANSWR database 314 through the ANSWR search platform 320 in conjunction with the conventional sources and may include other conventional web-based sources (e.g., GOOGLE 316, BING 318, ALTAVISTA, ASK.COM, YAHOO, etc, or in some embodiments any combination of search services). In other embodiments, the ANSWR system 300 provides integrated/federated search functions as an application executed on the user's computer or accessed on-line from the user's computer.

According to one embodiment, the ANSWR database 314 serves as a repository of validate information. For example, information that has been commented on, identified by users as responsive, identified as an answer, agreed with, disagreed with, etc. is used by the system as "validated" information. Based on such endorsements or disparagements, the ANSWR system 300 can return augment results to user queries (e.g., at 322). The augmented results can include results returned from conventional searches and sources (e.g., 324). In one example, the system 300 can order the returned results to emphasize validated information. Additionally, the ANSWR UI allows users to add comments to non-validated information to add new content and new information sources to system (e.g., at 326). Users may be given the option to add comment by selecting tags when viewing non-validated information (e.g., tags for "this is the answer," "agree," "disagree," "problem solved," etc. In some embodiments, user can created validated information from non-validated sources, clipping portions of a web page into an answer document or validation information object. In one example, the system 300 can be configured to capture attribution information from an information source when clipping portions of the displayed information.

In addition to publically accessible information sources, system 300 may access information from private or third party sources. For example, system 300 can be integrated through a connector framework 328 to other information sources. The connector framework 328 can include specialized APIs for specific known services (e.g., Salesforce 334 at connector 330 and/or Sharepoint 336 at connector 332 among other examples) or more generic APIs that can be configured to integrate third party services with the ANSWR system 300. In some embodiments, the connector framework 328 can be configured to manage access to all data repositories include, for example, ANSWR database 314 (e.g., through connector 338). Under such an architecture, the connector framework can manage all information accessible on the system as one repository.

Additionally, the connector framework 328 can manage document ingestion into the system 300. According to one embodiment, validated information can be populated into the system's knowledge (e.g., 314), by the system automatically. The system 300 can include a document processing pipeline 340. The document processing pipeline 340 can capture information from any connected information source (e.g., 324, 336, and 328). For example, the system can execute system generated queries and process the results as seeded data in the knowledge base. The pipeline 340 can also be configured to extracts data, URLs, or concepts from this organization based information for inclusion in the knowledge base, as well as use the extracted data to perform web crawling to find additional source content. The system can also store user queries executed on the ANSWR platform and re-execute those queries against others sources to bring in additional information.

The entire knowledge base of validated information or knowledge domains (including for example user commented and system seeded data) can be accessed by the search platform 320 to return system ranked results. The results can be ranked based on relevancy and system scores. For example, relevancy and ranking is determined by the system based on customer scoring algorithms executed by the system. In particular, user endorsement can add points to the score for validated information, additional user agreement, user access, user comments, can all be associated with, for example, point values that can be added to the score for respective validated information. Each of the values added can also be weighted based on the users providing the comment or endorsements. User may also be associated with scores and/or skill level that influence a weight associated with their activity.

According to one embodiment, the search platform 320 can be accessed through the ANSWR API from third party information systems (e.g., 342). The third party systems can execute local applications (e.g., 344) to permit integration or can access the application on-line. Users on the third party systems can submit queries 346 and receive validated information as results at 348.

Regardless of how the system 300 is accessed or architected, the system can be configured to provide a variety of services. According to one embodiment, the system services 350 include logging 352 of search activity. In one example, logging of search activity can include storing logged information in association with validated information generated from the search results. Additionally, access information can be captured and stored in conjunction with validated information (e.g., as summary statistics reflecting use, lists of accessing users, etc.).

According to another embodiment, the system services can also include functions for executing a relevancy management console 354. The relevancy management console 354 can be configured to tailor scoring of information and/or users to implement or adjust system scoring of validated information and thus ordering of results based on the scores. The relevancy management console 354 can be used to define a scoring algorithm and/or modify an existing scoring system.

In one embodiment, the system services can also include admin functions 356. The admin function can include any one or more of: managing user registration; defining a unique profile for respective users, allowing users to capture credibility ratings developed from other sites and information systems; providing administrative control of user profile information and/or settings; defining foldering options in user profiles; enabling users to manage operation of the system and default settings; and other functions. The admin functions 356 can also include, for example, any one or more of the functions, operations, and processes discussed above with respect to the admin component.

In another embodiment, the system services can also include scheduler functions 358, configured to schedule operation performed on the system 300. In one example, the system 300 can schedule any automatic ingestion operations so that they occur in low utilization or downtimes for the system.

According to one embodiment, the system UI is configured to provide support for any computing device used to access the system 300. For example, programming interfaces are provided to end users connecting via mobile devices, smart phones, laptops, etc. According to various embodiments, the system can include UI framework configurable to provide UI support to various computing devices, operating systems, and/or execution browser. In one example, the UI framework includes an application support component configured to deploy system functionality as one or more of: a browser bar or browser plug-in, a web application, and a locally executed application. The UI framework can support multiple browser types and versions including: Chrome, FireFox, and IE.

Figure 4:
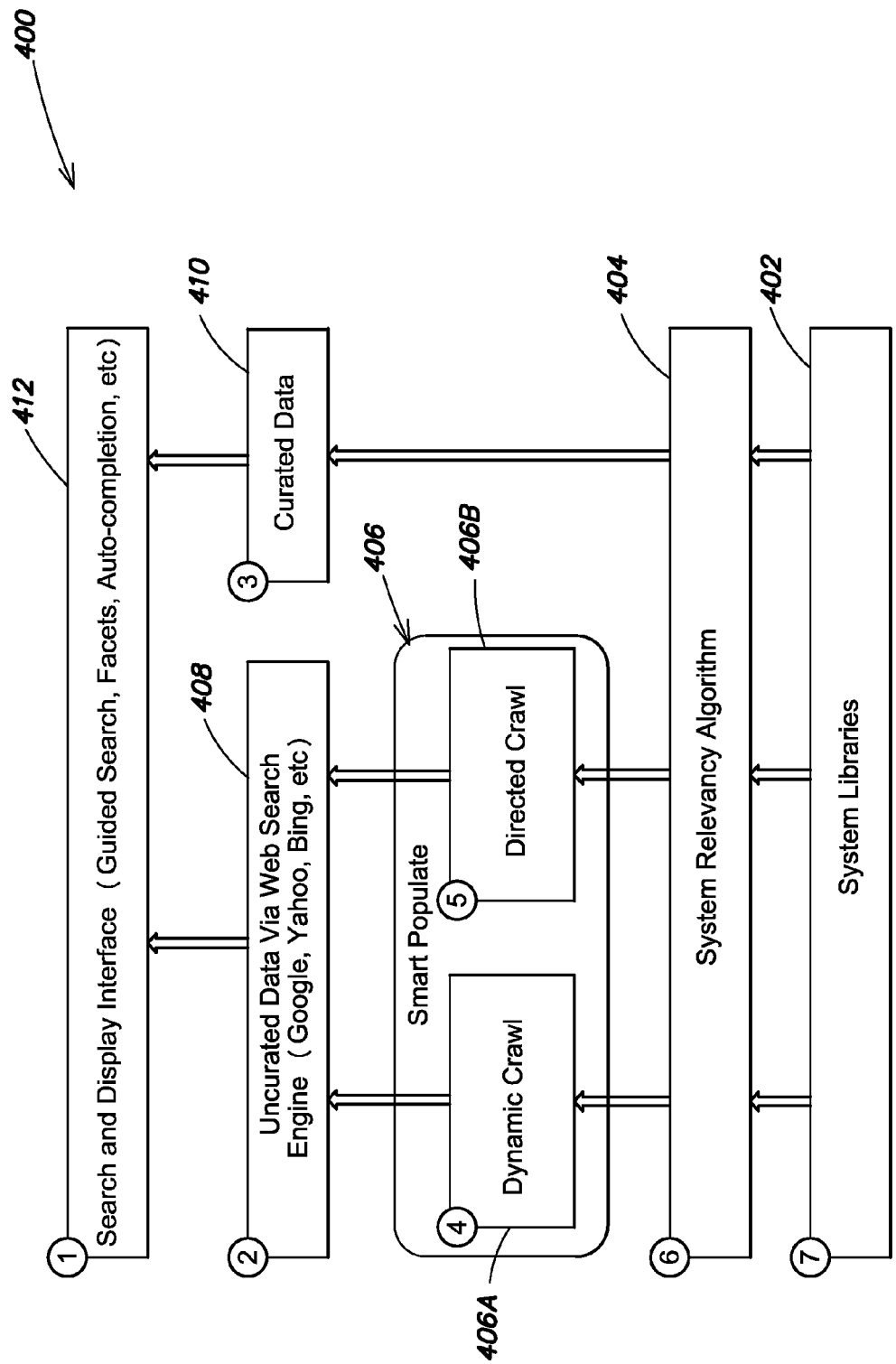
FIG. 4 is an example process flow for delivering results responsive to user searches, according to one embodiment.

Various embodiments of a validation system (including, for example, 100-300) can execute a variety of processes to implement the functions discussed, and in particular to return validated information as results to user queries. Shown in FIG. 4 is an example process flow 400 for delivering curated/validated and uncurated/non-validated data responsive to user searches. At 402, system libraries within the system knowledge base are accessed to match search queries. The system's relevancy scoring algorithm will be used to set the ordering of the results returned (e.g., from the system libraries) at 404. The system can provide relevancy rankings within validated data results as well as provide ranking between validated data and non-validated data results. For example, search results generated can include results drawn from smart populated processing at 406.

According to some embodiments, smart populate processing can include directed crawl operations (e.g., at 406B), where the system automatically crawls, for example, web resources based on seed lists of expert sites. Results returned from directed crawl activity can be promoted over non-validated results, for example, as part of 408. Additionally, smart populated processing 406 can include dynamic crawl operations (e.g., at 406A), where the user queries are captured in real-time to extract keywords, which are used to execute searches on those keywords on web resources, expert domain sites, and other relevant sources stored, for example, in administration libraries. Results from the smart populate processing can be included in results sets as uncurated or non-validate data at 408 which can be combined with curated or validated data from 410 for display as a complete result set at 412. For example, users may access a search and display interface to input query terms and received curated and non-curated results in response.

Process 400 may continue with users rating the results shown or tagging the results as relevant, solving the question, etc.

Figure 5A:
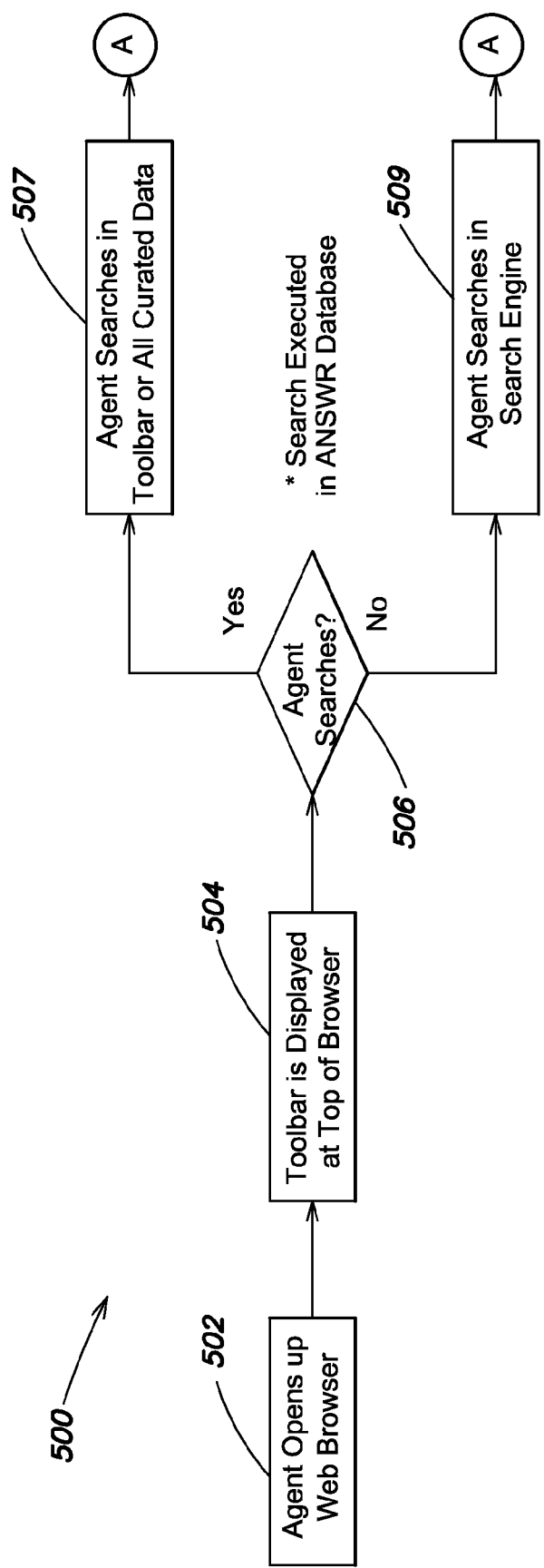
FIGS. 5A-B show an example process flow delivering validated information as part of search results, according to one embodiment.
Figure 5B:
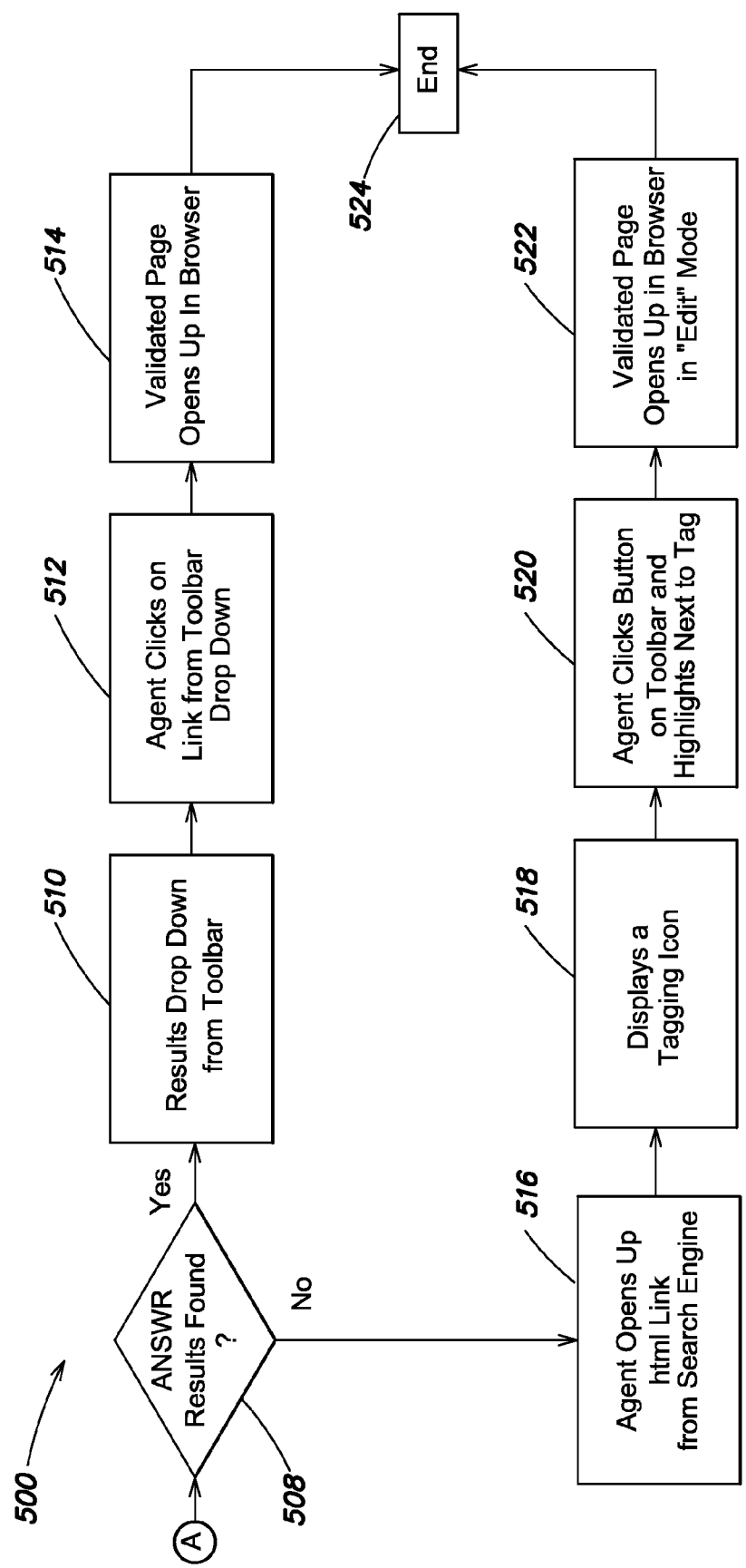

Various embodiments of a validation system (including, for example, 100-300) can execute a variety of processes to implement the functions discussed, and in particular to return validated information as results to user queries. Shown in FIGS. 5A-B is an example process flow 500 for delivering curated/validated as part of sets of results returns to user queries. According to some embodiments, the process 500 can be executed by a local browser plug-in and/or browser bar executing on a user's computer system. Process 500 can begin at 502 with a user (e.g., a technical support agent) opening up a browser running on a respective computer system. At 504, the search bar (e.g., browser tool bar) is displayed as part of whatever browser/search tool the user prefers. In some embodiment, the search bar can be integrated with third party information systems (e.g., CRM systems, CSS system, etc.) and native search tools can include tool bar displays for accessing search functionality for returning validated search results.

Process 500 continues at 506 with the user executing a search, for example, in the browser via a search site/tool via 506 NO, or, for example, in browser bar via 506 YES. In some embodiments, regardless of whether the user executes the search in the browser process 500 includes capturing and executing of the search against validation information. According to some implementations, searches are co-executed against validated and non-validated information sources (e.g., at 507 and 509).

If validated results are found 508 YES, process 500 continues with the display of the highest scored validated results at 510. According to one embodiment, as part of displaying validated results the validated results are displayed as drop down from the browser bar to provide a visual indication that the results are sources from the validated knowledge base (e.g., at 510). The validated results may be displayed above non-validated results (e.g., at 510). At 512, the user (e.g., agent) selects from among the displayed results. For example, if the user selects from validated results (512), a validated result is displayed at 514. According to some embodiments, the validated results are each developed through respective user collection of information into potential answers or resolutions of technical support issues. The answer objects can be scored and returned in response to user queries, where subsequent users can add their own tags (e.g., agree, disagree, resolved my problem, etc.), rate the answer object, which updates system scoring of the respective result. The system dynamically scores validated information, for example, based on usage and/or user comments. In some examples, the dynamic scoring is used by the system to order returned results.

Optionally, at 514 the browser bar is still available to return to the list of validated results allowing the user to select different results from the list of validated information results. Additional options can include functions for switching between validated results, accessing new result categories, user community, user preferences, and/or adding a result to a stored list of results.

According to some embodiments, process 500 proceeds at 516 if no validated information matches the executed search (508 NO). At 516, the user can select from a list of non-validated information sources. At 518, the browser bar provides a tagging display shown to the user in conjunction with a selected non-validated result. If user believes the viewed result provides a solution to their current issue, the user can select the entire result or portions of the result to tag for inclusion into an answer object at 520. In one example, the generation of answer object creates validated information stored in the system knowledge base.

Once the user selects information to include as validated information, a validated information display can be shown at 522. The user captured content and any additional user input (e.g., notes, tags, rating, etc.) can be stored as validated information at part of 522. Optionally, the user may select and include additional information (e.g., from other non-validated source) in the validate page as part of an edit mode. Once the user has completed their validated information page, process 500 can conclude at 524. For example, process 500 can conclude once a user has created validated information (e.g., an answer object) or, in another example, once the user has reviewed a validated result that the user can use for answering their inquiry. In some embodiments, once a user has reviewed a validated result that solved their problem, the user can add their own comments, insert new content into the answer object, among other options. In further examples, the reviewing user at 516 can rate the result and/or tag the results as a valid response to the user's query.

According to other embodiments, any non-validated result can be validated based on user input, further users can add comments and/or tags to validated results, each option can be stored on the system to augment knowledge base.

Figure 6:
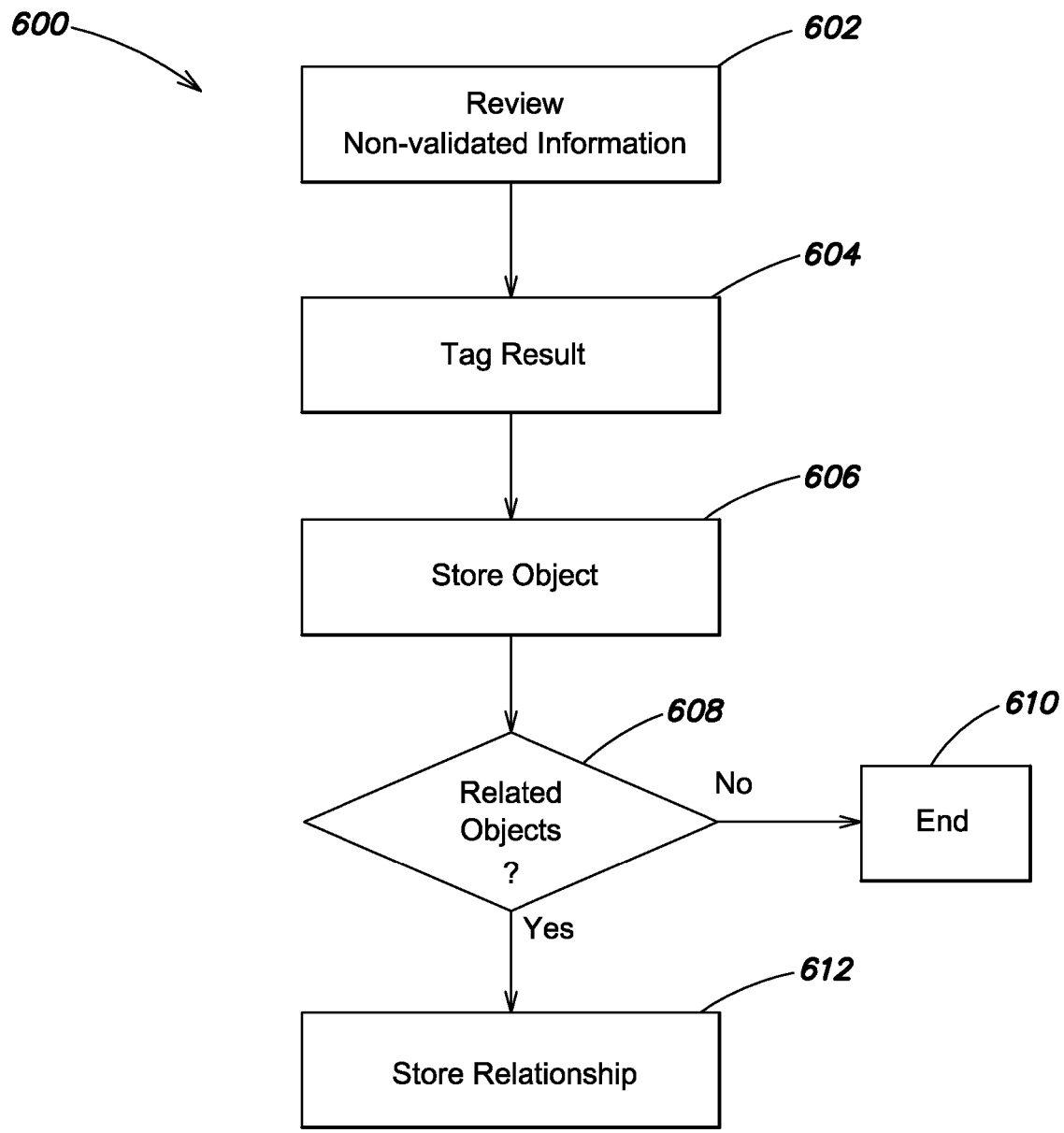
FIG. 6 is an example process for creating validated information, according to one embodiment.

Shown in FIG. 6 is an example process 600 for creating validated information, and in particular an answer object. According to one embodiment, process 600 beings at 602 with a user reviewing non-validated information, for example, from a set of search results. Once the user has found a solution to their inquiry, the user can tag the result at 604 to create validated information, which can be referenced in the technical support as an answer object. In one embodiment, the user tags the result by selecting content within the displayed information (e.g., click and drag on portions of the information source, copy and paste, etc.). The user then selects a "tag" function displayed on their respective computer system. Responsive to selection of the tag function, a tagging window can be displayed requesting the user input a title. In one example, the input title can be stored as the title of the answer object being created. In another embodiment, the title can be suggested to the user for confirmation. The system may extract concepts from the information source, from the search terms that generated the information source as a result, among other options. Once a portion of content has been selected and given a title it can be saved as validated information, including, for example, an answer object (e.g., at 606 below).

According to one embodiment, the answer object is intended to capture the best answer to a particular problem. The system can accomplish development of the best answer via continued generation of other user objects, comments agreeing with the user's solution, and/or usage of the user's solution. In some examples, a validation system (e.g., 100, 200, and 300) captures access information of other users search to infer that the last accessed result (e.g., the answer object) solved the user's problem. Inferential determinations can be made when the subsequent user's fail to tag, rate, or comment on the answer object.

In some embodiments, the user can capture information from multiple sources at 604, tagging portions or the entirety of one or more sources of information (e.g., web-pages, blog posts, etc.). In some embodiments, the user can build a complete answer object by accessing, capturing, and tagging information from any number of sources.

Once the user has completed assembly and/or editing of their validated information, for example, the answer object, the answer object is stored at 606. In one embodiment, responsive to selecting information content, the user is presented with a tagging display. The tagging display can request user input on a title and provide the user the opportunity to save the tagged information and title or cancel the request. According to some embodiments, storage of the validated information/answer object can include capture of the user's search activity. For example, the user's search terms can be captured at 606 and associated with a respective answer object. As part of the creation of the answer object, the user may define a general question that is being answered by the object. Any user defined question can be captured at 606, for example, as a title entered in the tagging display. In other embodiments, a title or question to be answered can be created automatically from the user's search activity. Search terms, search synonyms, etc. can be extracted from, for example, user queries and used to create the title for the answer object.

According to some implementations, answer objects are associated with the search terms and/or search activity that returned an associated information source as a search result. In other examples, the search terms can be processed to define concepts and/or topics associated with the answer object. At 608 YES, other answer objects can be associated with a newly created answer object based on a match between any one or more of: concept, topic, search terms, synonyms, search activity, etc. If no matching answer objects are found 608 NO, process 600 can terminate at 610.

If there are matching answer objects, process 600 can conclude with optional step 612, with storing any relationship between the objects. Step 612 may also include an ordering of the related objects based, for example, on scoring of the answer object. As discussed above, scoring of validated information, and, for example, an answer objects can be based on a variety of criteria. In one example, an answer object can be given a baseline score, which is adjusted upward or downward. In some examples, the baseline score can be adjusted upward or downward based on the user creating the answer object. If the originator is a recognized expert user, the baseline score can be adjusted upward according. Novice users can result in no adjustment or a downward adjustment. In other embodiments, subsequent access to the answer object causes the scoring to increase or decrease. User comments received in agreement with the answer object increase the scoring and user comments disagreeing can reduce the scoring.

Figure 7:
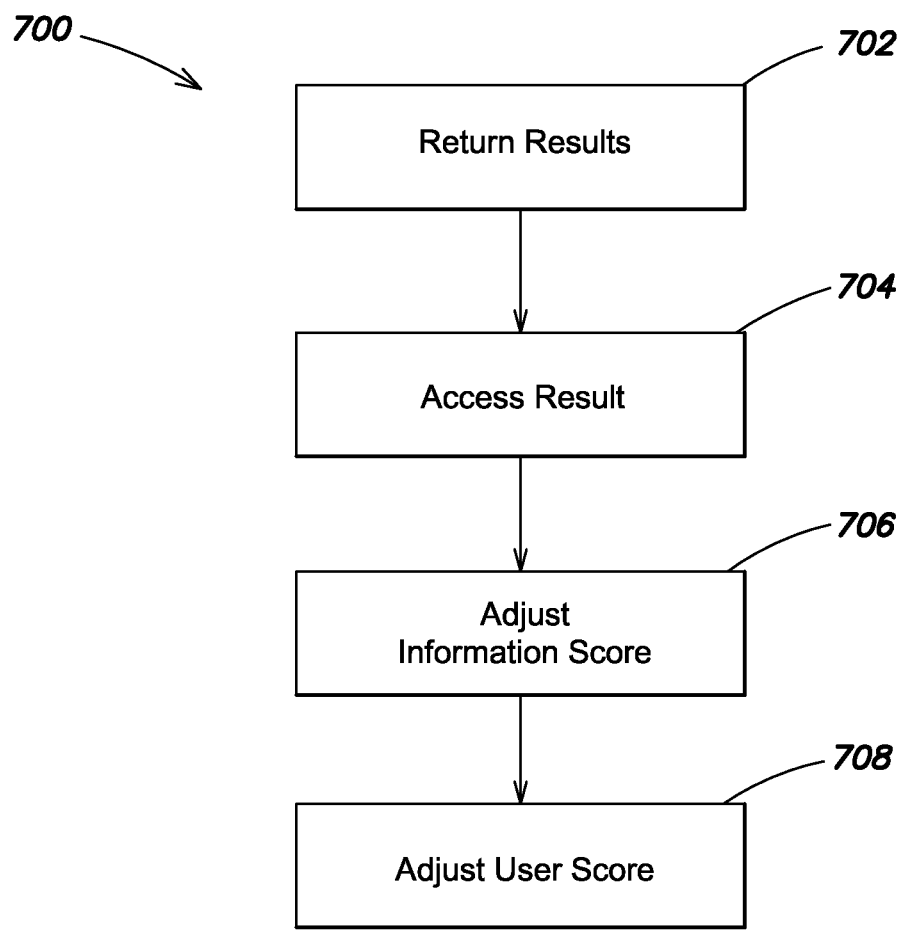
FIG. 7 is an example process for generating scores, according to one embodiment.

FIG. 7 illustrates an example embodiment of a process 700 for generating scores associated with a validation system. In one embodiment, the process 700 can begin at 702 with receipt of a set of results to a search query. At 704, a user can access a respective result from the set search results. For validated results, the user is presented with a display of the validating information. For an answer object, the display can include options to rate the result. Additionally or alternatively, the display can include options for tagging the result (e.g., agree, disagree, helpful, not helpful, among other options).

At 706, a current score (including, for example, a baseline score) for the validated information is adjusted. For example, the baseline score for an answer object can be adjusted upward as users agree or rate the answer object highly. In another example, the current score for the validated information can be adjusted downward based on low ratings or disagreement from other users. According to some embodiments, scores can also be adjusted based on disuse. For example, if an answer object is not accessed within a pre-defined period of time (e.g., a month), the answer object's score can be reduced. This automatically demotes results that are not being used. In another example, disuse adjustments can be limited to reducing the score to a baseline score. Likewise, usage information can be used to adjust scores upward, even when users do not tag the validated information.

User feedback and use information can also be incorporated into user scoring as well as scores for validated information. At 708, the user feedback (e.g., agree, disagree, rating, etc.) is captured to adjust a score associated with the user who generated the answer object being commented on. Similar to validation scores, each user can start with a baseline user score that is adjusted upwards or downwards responsive to their contributions, and other users' feedback on the same. According to some embodiments, a user's baseline score can also be modified based on their experience, any expertise, company affiliation, other system expertise scores (e.g., stackoverflow), among other options. In one embodiment, the commenting user's score is increased based having commented at 706. Additionally, the user score for the generator of the answer object is also adjusted.

According to one embodiment, process 700 can end at 710. In other embodiments, process 700 can be executed continuously as validated information is accessed, commented, used, etc. Both scores for validated information and users can continuously evolve, providing for dynamically evolution of a best answer and leading users.

Figure 8:
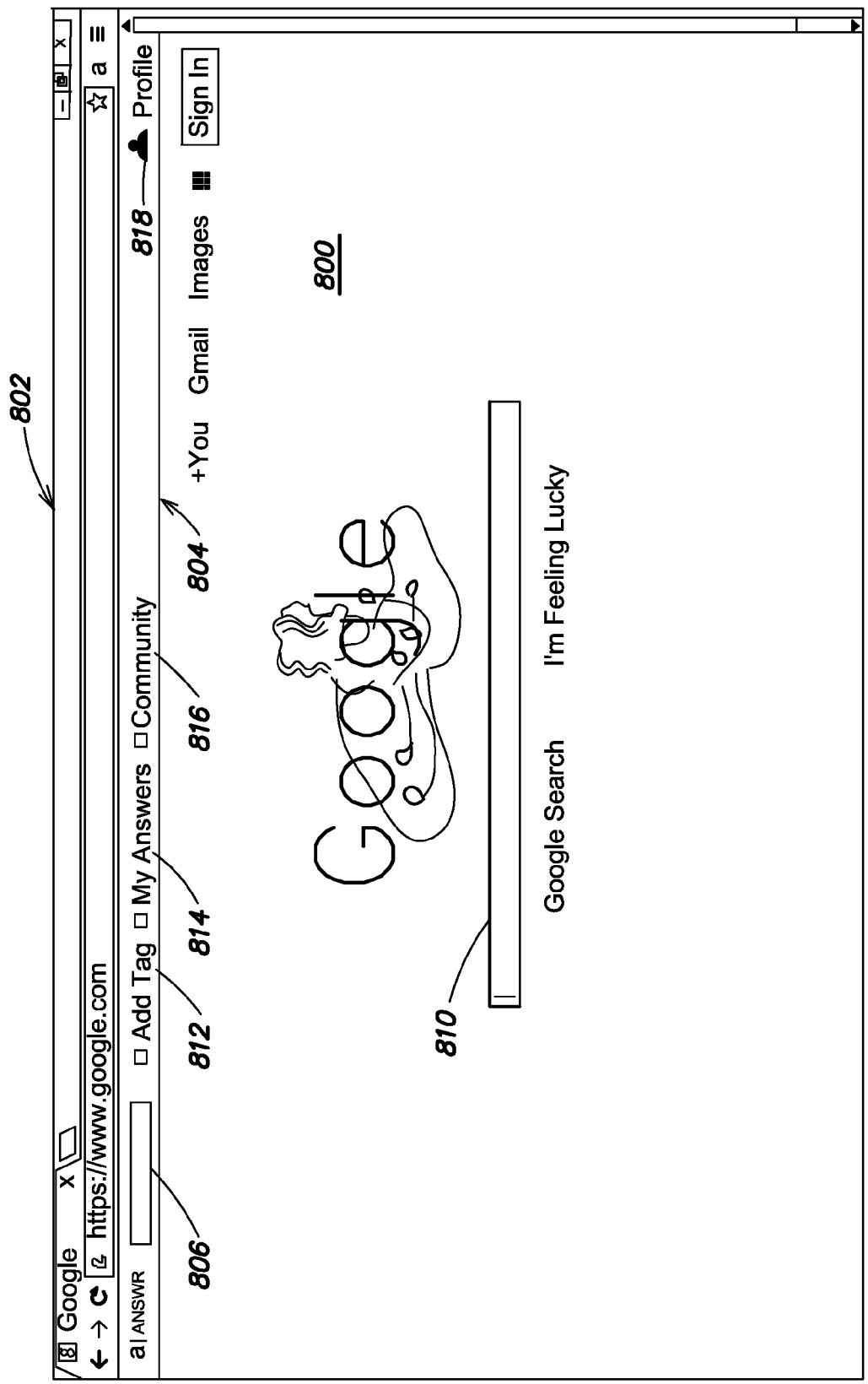
FIG. 8 is an example user interface for searching validated results, according to one embodiment.

Shown in FIG. 8 is an example embodiment of a user interface 800 for searching validated results. According to one embodiment, a web browser 802 (e.g., the known browser CHROME) is augmented by validated search functionality. The augmented search functionality can include a new browser tool bar at 804. In some embodiments, the browser tool bar can remain visualized whenever the underlying browser application is running. In other embodiments, the browser tool bar 804 can be visualized responsive to the access of search functionality. In one example, access to a search engine (e.g., the known GOOGLE search engine 808) results in visualization of the browser tool bar 804. The tool bar 804 can include functions for tagging results (e.g., 812) delivered in response to an input search, where the search is entered at 806 or 810. User can also access folders or saved answers at 814 "My Answers." The my answers function at 814 can be configured to transition to a display of saved answers and/or user created answers. In one embodiment, a user can access and see how well any answer objects they created are performing, how they are ranked, and what comments are being received, among other options. In other embodiments, 814 can be configured to take a user to an answer management console, where favorite answer objects (e.g., answers saved by the user, most accessed answers, saved answers) can be displayed with or without answer objects generated by the user.

According to some embodiments, the user interface can also include functionality (e.g., "Community" at 816) for accessing user communities of a validation system. The community function 816 can be configured to transition the web browser to a community interface. In one embodiment, the transition can be tailored to a current user context, so that the community interface displayed is targeted to an information domain (e.g., search concept, problem, problem topic, among other options), for example, captured from any existing search terms.

The tool bar can also include functions for accessing a user profile on a validation system (e.g., 818). A user may update their information their experience, job history, publications, etc. and stored that information as part of their profile. In some embodiments, a user can specify search preferences in their profile. For example, a user can identify one or more users to promote. Search results delivered, will be weighted to favor such identified users. For example, validated information generated by a preferred user can be returned as the top results of a search. In other examples, promotion scoring of information can be customized by user preference, weighting scorings to favor preferred users, and thus promoting those respective results.

Figure 9:
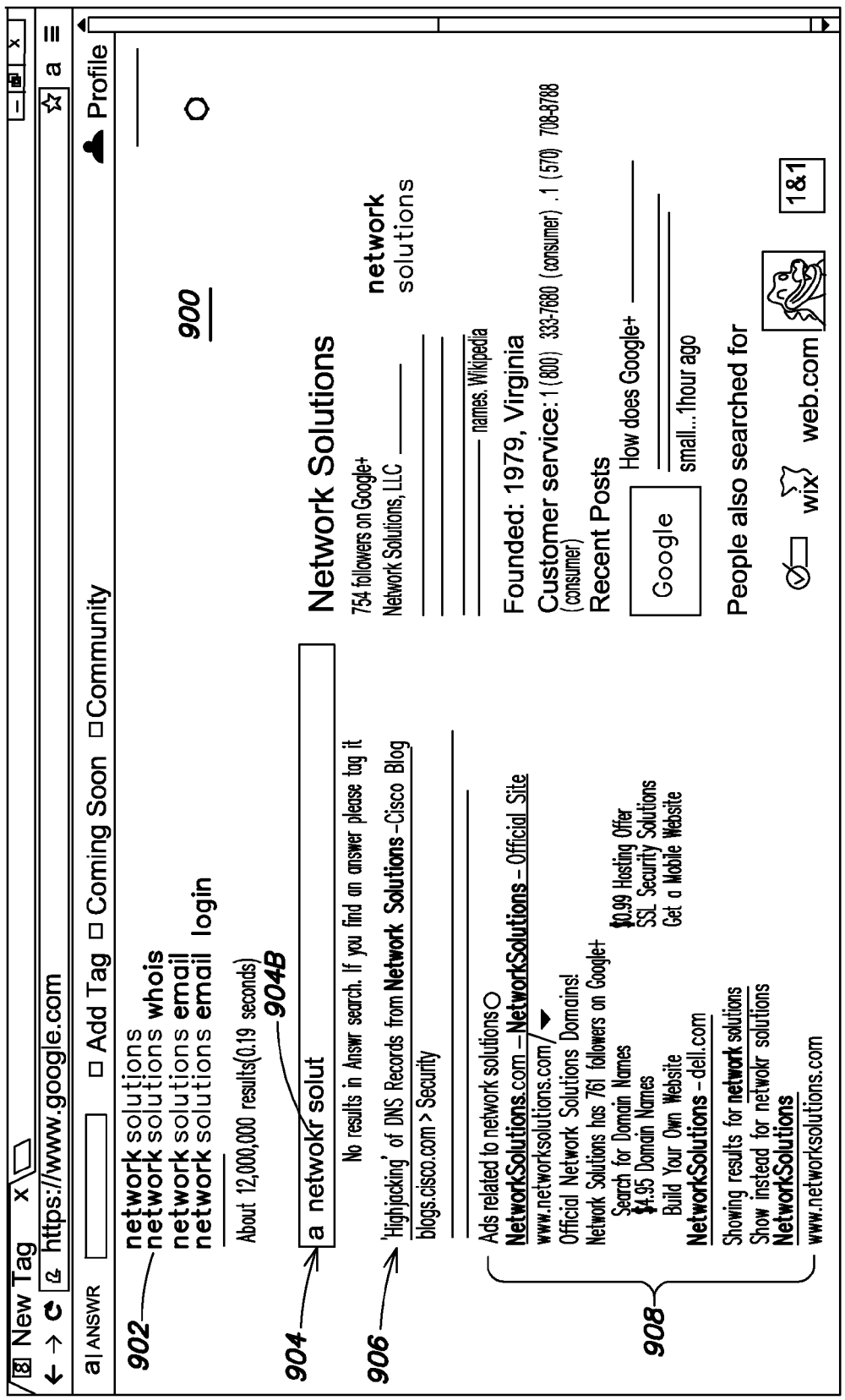
FIG. 9 is an example user interface, according to one embodiment.

Shown in FIG. 9 is example embodiment of a user interface 900 presented by a validation system. The user's search terms can be displayed at 902 including drop down selection of complete queries. In some embodiments, search synonyms, related query terms, etc. can be determined from administrative libraries available on the validation system. Library based suggestion can be incorporated at 902, for example, instead of suggestions that would be provided by a conventional search engine. At 904, results from searching performed on validation information are displayed. In one example, the display at 904 can be shown in real-time, thus the incomplete terms "network solut" 904B may not provide results.

According to one embodiment, a knowledge base associated with a validation system can include seeded results. The seeded results can be incorporated in a displayed set of results, for example, at 906. In some embodiments, responsive to not finding validated results, seeded results are displayed. In further examples, the seeded results can be incorporated into validated results shown in interface 900. According to one embodiment, validated results are shown preferentially in the user interface 900, appearing at the top of the display of results. In another embodiment, validated results are shown at the top of the user interface, followed by seeded results, and then by non-validated results (e.g., 908). Non-validated results can be shown as they would be presented in their respective search system. According to other embodiments, where multiple search sources are used (e.g., GOOGLE, BING, YAHOO, etc.) the non-validated results from each source can be interleaved to present the highest scored results from each respective source towards the top of the list of results. In further examples, duplicate responses received within the non-validated results can be eliminated.

Figure 10:
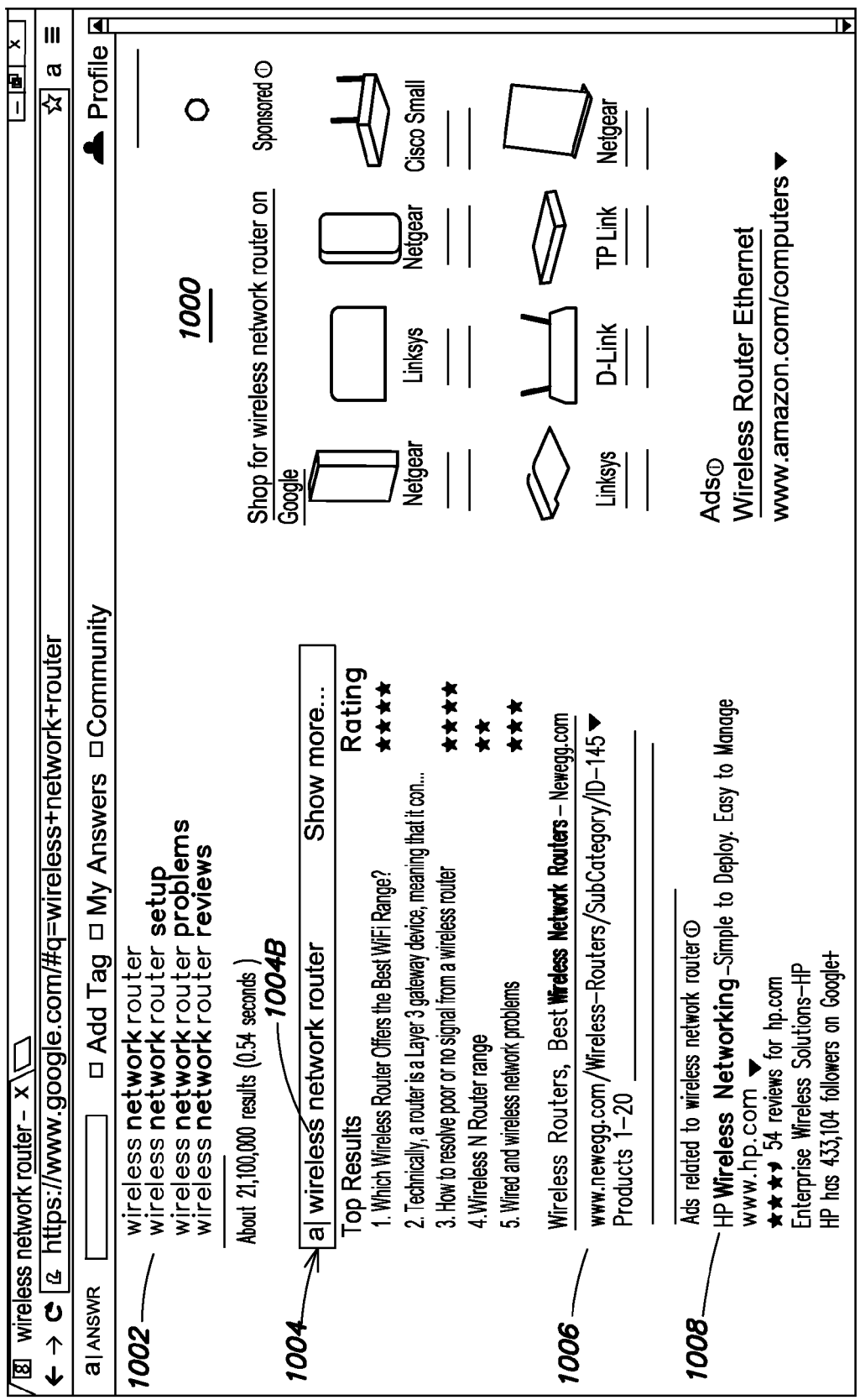
FIG. 10 is an example user interface, according to one embodiment.

Shown in FIG. 10 in an example embodiment of a user interface 1000. User interface can be displayed by a validation system, for example, as part of displaying a set of search results. In one embodiment, the user's search terms can be displayed at 1002 including drop down selection of complete queries. In some embodiments, search synonyms, related query terms, etc. can be determined from administrative libraries available on the validation system. Library based suggestion can be incorporated at 1002, for example, instead of suggestions that would be provided by a conventional search engine. At 1004, results from searching performed on validation information are displayed. In one example, the display at 1004 can be shown in real-time, with "wireless network router" 1004B listing a portion of a matching set of results. The validated results (including, for example, answer objects) can be ordered based on respective scoring, with the highest scored items appearing at the top of the validated display list. In some embodiments, the number of validated results in the display (e.g., 1000 at 1004) can be limited to a predefined threshold. In some examples, validated results that are not at or above a baseline score may not be displayed as well.

According to some examples, a displayed set of results can also include seeded results. For example, newegg.com may be a validated information source. As discussed above, users may validate information sources, indicating that a particular site is trustworthy or better than other sites for obtaining information and/or purchasing a product. According to some embodiments, the display order for results can include validated (e.g., 1004), seeded (e.g., 1006) and non-validated (e.g., 1008). In further embodiments, additional orderings can be made within each type of results.

Figure 11:
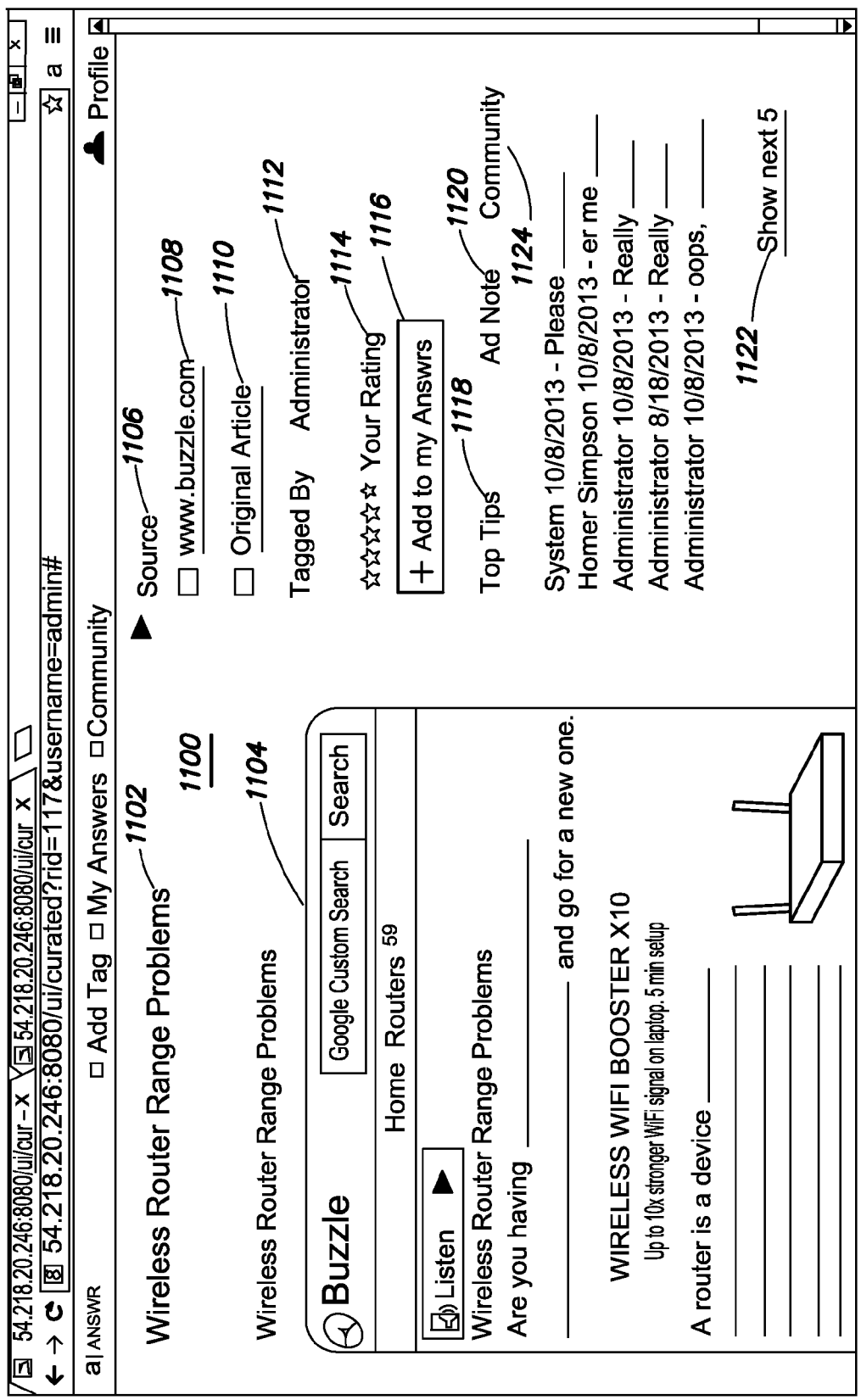
FIG. 11 is an example user interface, according to one embodiment.

Shown in FIG. 11 is an example embodiment of a user interface 1100. User interface 1100 can be displayed by a validation system, for example, as part of displaying a validated information result. The validated information results can include a title 1102 for the validated information. For example, the title can reflect a question answered by the validated information. In the technical support, setting the tile can reflect the technical support question resolved by the validated information or answer object. As discussed above, title 1102 can be generated automatically and/or input by a user creating, for example, an answer object. At 1104, source content providing information on the answer and/or problem is presented as part of the display of the validated information (including for example, answer objects). The source content can be captured by a user, for example, reviewing non-validated information. The user can select one or more portions of information or the entirety of an information source they deem relevant to their answer. According to one embodiment, each display of validated information can include source information (e.g., at 1106). The source information can include a source url at 1108, a link to the original article at 1110, and an identification of the user who created the validated information at 1112. In some embodiments, where the validating information is sources from multiple locations, respective sources and links can be displayed, for example, at 1106-1110.

According to some embodiments, displays of validated information are configured to accept reviewing user's input. In some examples, input can include tags by the user (e.g., agree, disagree, resolves my problem, etc.). In further examples, input from users can include explicit rating functions (e.g., 1114), where users provide input on a subjective score to assign to the validated information.

Users can also enter notes and/or tips associated with the validated information. At 1118, system rated top tips can be displayed with the validated information, as well as tools for entering new notes 1120. If the user wishes to review additional results from the validate information, the user may select next (e.g., at 1122). In some embodiments, a user can cause the system to transition from a validated information display to a system community (e.g., at 1124). User can discuss, chat, and/or evaluated validated information in the context of a user community. In some embodiments, various user communities can exist, where respective communities are direct to certain concepts, issues, problems, etc. Selection of community at 1124 can include capture of a user's current context so that a user can be transitioned into a community matching their current context.

Figure 12:
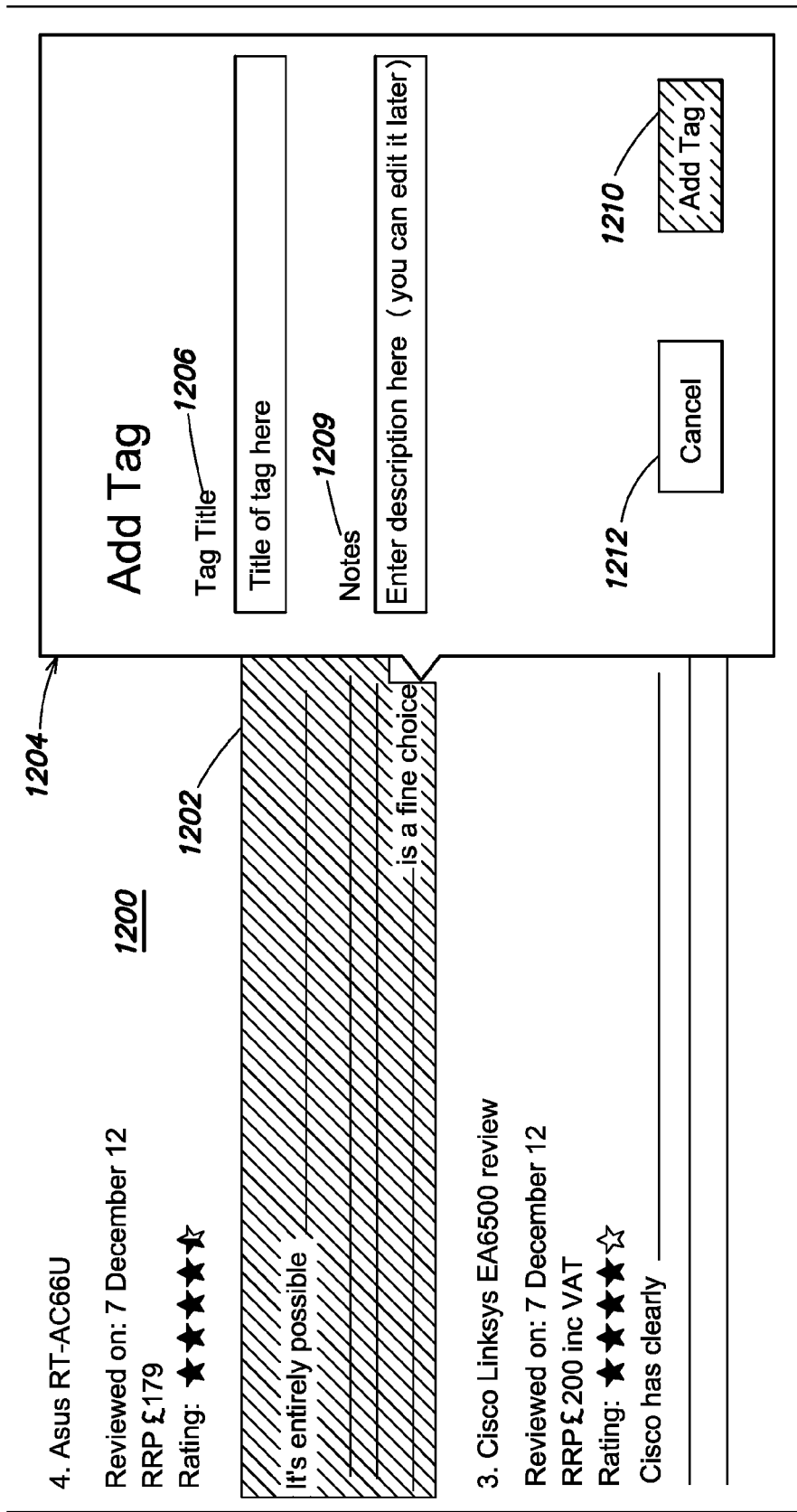
FIG. 12 is an example user interface, according to one embodiment.

Shown in FIG. 12 is an example embodiment of a user interface 1200. Responsive to highlighting a portion of a non-validated information source at 1202 and selecting "tag" (e.g., 812, FIG. 8), the user interface presents a tagging display 1204. The tagging display can provide a text box for inputting a title at 1206. In some examples, a validation system can suggest a title based on extracted concepts, an extracted title, search terms, etc., and the user can approved or edit the suggested title. At 1208, the display includes a text input box for adding notes. Once the user has input at least the title, the user can save the now validated information by selecting 1210 "Add Tag." In some embodiments, the highlighted portion 1202 is now saved as a searchable object in conjunction with information on the user who created the validated information. The searchable object can also be assigned a validation score. If the user does not wish to save the object or make changes, the user can select cancel at 1212.

In one embodiment, the validation score can be determined based at least in part on the user who created the object. In another embodiment, the source from which the information object was generated can be used as part of a determination of a validation score. In some examples, the object can be assigned a baseline score. In further examples, the baseline score can be modified based on the generating user, the information source, etc. As discussed above, subsequent access the object can be used by a validation system to modify the scored associated with the object.

Example Environment

According to one embodiment, a validation system can be implemented to service technical support workers and/or integrate with existing knowledge management systems. In one example, the validation system provides significant enhance over conventional approaches (e.g., GOOGLE based search). According to one embodiment, validated results, which have been determined by one or more users to provide a valid answer to a problem, are returned in conjunction with conventional search. The technical support worker does not need to do anything different to see new validate results. In one example, the system captures search terms entered into GOOGLE and co-executes the search against validated information. By promoting validated results, research time by the technical support worker is reduced. Further, first call resolution rates are increased, for example, by providing answers that have already been used.

Example Computer System

As discussed above with regard to FIGS. 1-3, various aspects and functions described herein may be implemented as specialized hardware or software modules executing in one or more computer systems. There are many examples of computer systems that are currently in use. These examples include, among others, network appliances, personal computers, workstations, mainframes, networked clients, servers, media servers, application servers, database servers and web servers. Other examples of computer systems may include mobile computing devices, such as cellular phones and personal digital assistants, and network equipment, such as load balancers, routers and switches. Further, aspects may be located on a single computer system, may be distributed among a plurality of computer systems connected to one or more communications networks, or may be cloud based.

For example, various aspects and functions may be distributed among one or more computer systems configured to provide a service to one or more client computers, or to perform an overall task as part of a distributed system. Additionally, aspects may be performed on a client-server or multi-tier system that includes components distributed among one or more server systems that perform various functions. Consequently, examples are not limited to executing on any particular system or group of systems. Further, aspects and functions may be implemented in software, hardware or firmware, or any combination thereof. Thus, aspects and functions may be implemented within methods, acts, systems, system elements and modules using a variety of hardware and software configurations, and examples are not limited to any particular distributed architecture, network, or communication protocol.

Figure 13:
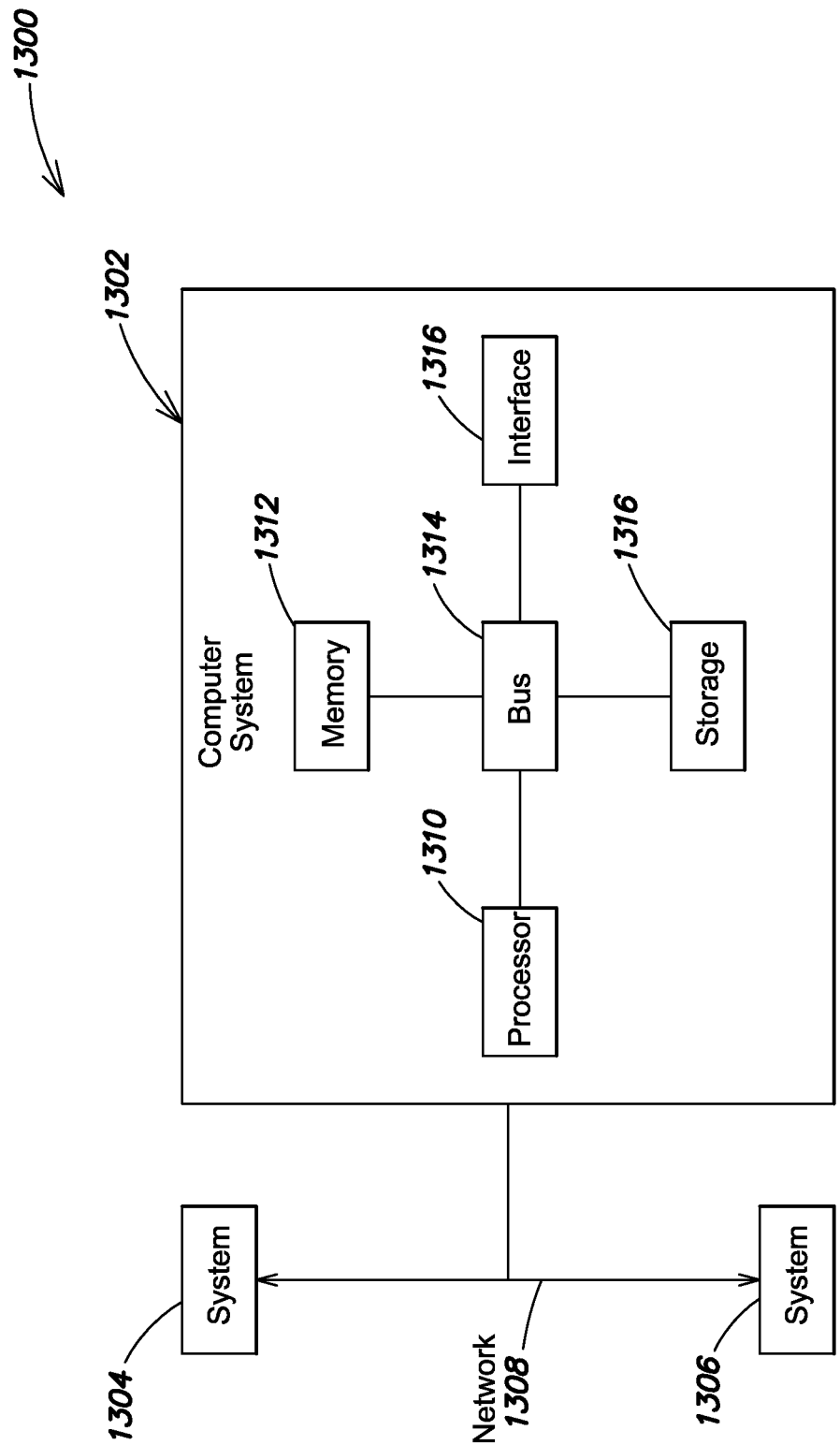
FIG. 13 is block diagram of a computer system upon which various aspects and embodiments can be executed.

Referring to FIG. 13, there is illustrated a block diagram of a distributed computer system 1300, in which various aspects and functions are practiced. As shown, the distributed computer system 1300 includes one or more computer systems that exchange information. More specifically, the distributed computer system 1300 includes specially configured computer systems 1302, 1304 and 1306. As shown, the computer systems 1302, 1304 and 1306 are interconnected by, and may exchange data through, a communication network 1308. For example, a fsbo system, subsystems, and/or modules can be implemented on 1302, which can communicate with other systems (1304-1306), which operate together to provide the functions and operations as discussed herein.

In some embodiments, the network 1308 may include any communication network through which computer systems may exchange data. To exchange data using the network 1308, the computer systems 1302, 1304 and 1306 and the network 1308 may use various methods, protocols and standards, including, among others, Fibre Channel, Token Ring, Ethernet, Wireless Ethernet, Bluetooth, IP, IPV6, TCP/IP, UDP, DTN, HTTP, FTP, SNMP, SMS, MMS, SS13, JSON, SOAP, CORBA, REST and Web Services. To ensure data transfer is secure, the computer systems 1302, 1304 and 1306 may transmit data via the network 1308 using a variety of security measures including, for example, TLS, SSL or VPN. While the distributed computer system 1300 illustrates three networked computer systems, the distributed computer system 1300 is not so limited and may include any number of computer systems and computing devices, networked using any medium and communication protocol.

As illustrated in FIG. 13, the computer system 1302 includes at least one processor 1310, a memory 1312, a bus 1314, an interface 1316 and data storage 1318. To implement at least some of the aspects, functions and processes disclosed herein, the processor 1310 performs a series of instructions that result in manipulated data. The processor 1310 may be any type of processor, multiprocessor or controller. Some exemplary processors include commercially available processors such as an Intel Xeon, Itanium, Core, Celeron, or Pentium processor, an AMD Opteron processor, a Sun UltraSPARC or IBM Power5+ processor and an IBM mainframe chip. The processor 1310 is connected to other system components, including one or more memory devices 1312, by the bus 1314.

The memory 1312 stores programs and data during operation of the computer system 1302. Thus, the memory 1312 may be a relatively high performance, volatile, random access memory such as a dynamic random access memory (DRAM) or static memory (SRAM). However, the memory 1312 may include any device for storing data, such as a disk drive or other non-volatile storage device. Various examples may organize the memory 1312 into particularized and, in some cases, unique structures to perform the functions disclosed herein. These data structures may be sized and organized to store values for particular data and types of data.

Components of the computer system 1302 are coupled by an interconnection element such as the bus 1314. The bus 1314 may include one or more physical busses, for example, busses between components that are integrated within the same machine, but may include any communication coupling between system elements including specialized or standard computing bus technologies such as IDE, SCSI, PCI and InfiniBand. The bus 1314 enables communications, such as data and instructions, to be exchanged between system components of the computer system 1302.

The computer system 1302 also includes one or more interface devices 1316 such as input devices, output devices and combination input/output devices. Interface devices may receive input or provide output. More particularly, output devices may render information for external presentation. Input devices may accept information from external sources. Examples of interface devices include keyboards, mouse devices, trackballs, microphones, touch screens, printing devices, display screens, speakers, network interface cards, etc. Interface devices allow the computer system 1302 to exchange information and to communicate with external entities, such as users and other systems.

The data storage 1318 includes a computer readable and writeable nonvolatile, or non-transitory, data storage medium in which instructions are stored that define a program or other object that is executed by the processor 1310. The data storage 1318 also may include information that is recorded, on or in, the medium, and that is processed by the processor 1310 during execution of the program. More specifically, the information may be stored in one or more data structures specifically configured to conserve storage space or increase data exchange performance.

The instructions stored in the date storage may be persistently stored as encoded signals, and the instructions may cause the processor 1310 to perform any of the functions described herein. The medium may be, for example, optical disk, magnetic disk or flash memory, among other options. In operation, the processor 1310 or some other controller causes data to be read from the nonvolatile recording medium into another memory, such as the memory 1312, that allows for faster access to the information by the processor 1310 than does the storage medium included in the data storage 1318. The memory may be located in the data storage 1318 or in the memory 1312, however, the processor 1310 manipulates the data within the memory, and then copies the data to the storage medium associated with the data storage 1318 after processing is completed. A variety of components may manage data movement between the storage medium and other memory elements and examples are not limited to particular data management components. Further, examples are not limited to a particular memory system or data storage system.

Although the computer system 1302 is shown by way of example as one type of computer system upon which various aspects and functions may be practiced, aspects and functions are not limited to being implemented on the computer system 1302 as shown in FIG. 13. Various aspects and functions may be practiced on one or more computers having different architectures or components than that shown in FIG. 13. For instance, the computer system 1302 may include specially programmed, special-purpose hardware, such as an application-specific integrated circuit (ASIC) tailored to perform a particular operation disclosed herein. While another example may perform the same function using a grid of several general-purpose computing devices running MAC OS System X with Motorola PowerPC processors and several specialized computing devices running proprietary hardware and operating systems.

The computer system 1302 may be a computer system including an operating system that manages at least a portion of the hardware elements included in the computer system 1302. In some examples, a processor or controller, such as the processor 1310, executes an operating system. Examples of a particular operating system that may be executed include a Windows-based operating system, such as, Windows NT, Windows 2000 (Windows ME), Windows XP, Windows Vista, Windows 13 or 8 operating systems, available from the Microsoft Corporation, a MAC OS System X operating system available from Apple Computer, one of many Linux-based operating system distributions, for example, the Enterprise Linux operating system available from Red Hat Inc., a Solaris operating system available from Sun Microsystems, or a UNIX operating systems available from various sources. Many other operating systems may be used, and examples are not limited to any particular operating system.

The processor 1310 and operating system together define a computer platform for which application programs in high-level programming languages are written. These component applications may be executable, intermediate, bytecode or interpreted code which communicates over a communication network, for example, the Internet, using a communication protocol, for example, TCP/IP. Similarly, aspects may be implemented using an object-oriented programming language, such as .Net, SmallTalk, Java, C++, Ada, C# (C-Sharp), Objective C, or Javascript. Other object-oriented programming languages may also be used. Alternatively, functional, scripting, or logical programming languages may be used.

Additionally, various aspects and functions may be implemented in a non-programmed environment, for example, documents created in HTML, XML or other format that, when viewed in a window of a browser program, can render aspects of a graphical-user interface or perform other functions. Further, various examples may be implemented as programmed or non-programmed elements, or any combination thereof. For example, a web page may be implemented using HTML while a data object called from within the web page may be written in C++. Thus, the examples are not limited to a specific programming language and any suitable programming language could be used. Accordingly, the functional components disclosed herein may include a wide variety of elements, e.g., specialized hardware, executable code, data structures or data objects, that are configured to perform the functions described herein.

In some examples, the components disclosed herein may read parameters that affect the functions performed by the components. These parameters may be physically stored in any form of suitable memory including volatile memory (such as RAM) or nonvolatile memory (such as a magnetic hard drive). In addition, the parameters may be logically stored in a propriety data structure (such as a database or file defined by a user mode application) or in a commonly shared data structure (such as an application registry that is defined by an operating system). In addition, some examples provide for both system and user interfaces that allow external entities to modify the parameters and thereby configure the behavior of the components.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the scope of the invention. Accordingly, the foregoing description and drawings are by way of example only.

What is claimed is:

1. A system for managing validated information, the system comprising:
   at least one processor operatively connect to a memory;
   a search component, executed by the at least one processor, configured to:
      execute searches on a validated information source based on search activity from a user captured from a browser window through execution of a search application program interface ("API");
      monitor the search activity of the user performed against at least one non-validated information source through the search API;
      integrate validated results returned from the validated information source with non-validated results generated against the at least one non-validated information source;
   a display component, executed by the at least one processor, configured to generate a display of the validated and non-validated results shown on a computer system of the user, wherein the display component is further configured to:
      order the display of the integrated results such that respective ones of a plurality of validated results are displayed proximate to a visual indicator identifying that the results have been returned from the validated information source and such that respective ones of the plurality of non-validated results follow the validated results in the display;

display tagging interfaces for selection, wherein the tagging interfaces are configured to display a tagging window responsive to selection;

responsive to selection of at least one tagging interface, generate and display in an overlay view the tagging window associated with a currently selected result;

transform the currently selected result from a non-validated information source into a validated information source responsive to entry and saving of user commentary in the overlay view.

2. The system according to claim 1, wherein the display component is configured to:

order at least the plurality of validated results based on respective validation scores associated with the respective results; and order seeded results such that the plurality of validated results appear first within the display, seeded results follow the validated results, and non-validated results follow the seeded results in the display.

3. The system according to claim 1, wherein the display component is configured to group the displayed results based on whether the results are from validated, seeded, or non-validated information sources.

4. The system according to claim 3, the display component is configured to order at least the validated results within the grouped display based on respective validation scores associated with the respective results.

5. The system according to claim 1, further comprising a generation component, executed by the at least one processor, configured to create validated information.

6. The system according to claim 5, wherein the generation component is configured to identify related validated information by matching at least one of concept, search terms, or search activity associated with the validated information.

7. The system according to claim 5, wherein the generation component is configured to capture at least a portion of a non-validated information source responsive to user input, and store the at least a portion of the non-validated information source as an answer object.

8. The system according to claim 6, wherein the generation component is configured to merge at least another portion of at least one additional non-validated information source into the answer object.

9. The system according to claim 1, further comprising a promotion component, executed by the at least one processor, configured to assign a validation score to validated information.

10. The system according to claim 9, wherein the promotion component is configured to determine the validation score based on at least one of a generating user's profile information, an information source for the validated information, or a baseline score.

11. The system according to claim 9, wherein the promotion component is configured to determine the validation score for an information object responsive to a knowledge domain or knowledge sub-domain.

12. The system according to claim 9, wherein the promotion component is configured to modify the validation score associated with respective validated information based on subsequent access to the respective validated information.

13. The system according to claim 12, wherein subsequent access includes at least: returned a result to a search, accessed by a subsequent user, commented on by a subsequent user, rated by a subsequent user, and tagged by a subsequent user.

14. The system according to claim 1, further comprising a promotion component, executed by the at least one processor, configured to determine a user score for respective users.

15. The system according to claim 14, wherein the promotion component is configured to identify expert users within a knowledge domain or sub-domain based on the user score.

16. The system according to claim 14, wherein the promotion component is configured to determine a respective domain based user score for a respective user within a plurality of knowledge domains or sub-domains.

17. The system according to claim 14, wherein the promotion component is configured to modify the user score based on at least one of user activity or feedback received on user generated content.

18. The system according to claim 17, wherein the promotion is configured to determine the user score within a knowledge domain or a knowledge sub-domain.

19. The system according to claim 1, further comprising a community component configured to provide access to validated information.

20. The system according to claim 19, wherein the community component is configured to generate validated information.

21. The system according to claim 19, wherein the community component is configured to accept questions and track responses from a user community.

22. A computer implemented method for managing validated information, the method comprising:

executing, by a computer system, searches on a validated information source based on search activity from a user captured from a browser window through execution of a search application program interface ("API");

monitoring, by the computer system, the search activity of the user performed against at least one non-validated information source through the search API;

integrating, by the computer system, validated results returned from the validated information source with non-validated results generated against the at least one non-validated information source;

generating, by the computer system, a display of the validated and non-validated results wherein generating the display includes acts of:

ordering the display of the integrated results such that respective ones of a plurality of validated results are displayed proximate to a visual indicator identifying that the results have been returned from the validated information source and such that respective ones of the plurality of non-validated results follow the validated results in the display;

displaying, by the computer system, tagging interfaces, wherein the tagging interfaces are configured to display a tagging window responsive to selection;

generating, responsive to selection, the tagging window as an overlay view, wherein the tagging window is associated with a currently selected result; and transforming, by the computer system, the currently selected result from a non-validated information source into a validated information source responsive to entry and saving of user commentary in the overlay view.

23. The method according to claim 22, further comprising an act of ordering at least the validated results based on respective validation scores associated with the respective results.

24. The method according to claim 22, further comprising an act of grouping the displayed results based on whether the results are from validated or non-validated information sources.

25. The method according to claim 22, further comprising an act of generating validated information.

26. The method according to claim 25, further comprising an act of identifying related validated information by matching at least one of concept, search terms, or search activity associated with the validated information.

27. The method according to claim 25, wherein the act of generating validated information includes capturing at least a portion of a non-validated information source responsive to user input, and storing the at least a portion of the non-validated information source as an answer object.

28. The method according to claim 27, wherein storing the at least a portion of the non-validated information source as an answer object includes merging at least another portion of at least one additional non-validated information source into the answer object.

29. The method according to claim 22, further comprising an act of assigning a validation score to validated information.

30. The method according to claim 29, wherein the act assigning the validation score includes determining the validation score based on at least one of a generating user's profile information, an information source for the validated information, or a baseline score.

31. The method according to claim 22, further comprising an act of determining a user score for respective users.

32. A system for managing technical support queries against integrated information sources, the system comprising:
  at least one processor operatively connect to a memory;
  a search component, executed by the at least one processor, configured to:
    execute searches on at least one validated information source and at least one non-validated information source to determine an answer to a technical support question;
    monitor search activity of the user via an application program interface ("API");
    integrate validated results returned from the at least one validated information source with non-validated results returned against the at least one non-validated information source;
  a display component, executed by the at least one processor, configured to:
    generate a display of the integrated validated and non-validated results;
    display an indication of validate search results in a portion of a browser window;
    order the display of the integrated results such that the validated results are displayed proximate to the indication of the validated search results and such that the non-validated results appear after the validated results in the display;
  the API configured to:
    trigger execution of searches by the search component responsive to user search activity in a browser window;
    display tagging interfaces for selection within the browser window;
    display a tagging window responsive to selection of at least one tagging interface, wherein the tagging window is shown in an overlay display associated with a selected search result;
  the tagging window configured to:
    accept user specification of tagging information for the selected search result, including a title for a validated information source, and a source identifier for information being captured from the selected search result; and
    save the selected search result as the validated information source responsive to selection in the tagging window; and
  wherein the system is further configured to:
    generate seeded information, based on system generated tags or system generated comments introduced automatically into non-validated search results;
    integrate the seeded information with the validated results returned from the at least one validated information source and the non-validated results returned against the at least one non-validated information source.

* * * * *